(12) United States Patent
Bloemer et al.

(10) Patent No.: US 7,574,871 B2
(45) Date of Patent: Aug. 18, 2009

(54) SYSTEMS AND METHODS FOR WHOLE-HOUSE DEHUMIDIFICATION BASED ON DEW POINT MEASUREMENTS

(75) Inventors: John M. Bloemer, Sun Prairie, WI (US); Timothy E. Higgins, Madison, WI (US)

(73) Assignee: Research Products Corporation, Madison, WI (US)

( * ) Notice: Subject to any disclaimer, the term of this patent is extended or adjusted under 35 U.S.C. 154(b) by 661 days.

(21) Appl. No.: 10/974,319

(22) Filed: Oct. 27, 2004

(65) Prior Publication Data

US 2006/0086112 A1    Apr. 27, 2006

(51) Int. Cl.
*F25B 49/00*  (2006.01)
*F25D 17/04*  (2006.01)
*G05D 22/02*  (2006.01)
*B01F 3/02*   (2006.01)
*F24F 3/14*   (2006.01)

(52) U.S. Cl. .................. 62/176.6; 236/44 R; 236/44 C; 165/230

(58) Field of Classification Search ................ 62/176.6, 62/176.1, 93; 236/44 R, 44 C, 44 A; 165/222, 165/229, 230
See application file for complete search history.

(56) References Cited

U.S. PATENT DOCUMENTS

| | | |
|---|---|---|
| 5,598,715 A | 2/1997 | Edmisten |
| 6,220,039 B1 * | 4/2001 | Kensok et al. .......... 62/93 |
| 6,619,063 B1 | 9/2003 | Brumett |

FOREIGN PATENT DOCUMENTS

| | | | |
|---|---|---|---|
| JP | 01270925 A | * | 10/1989 |
| JP | 06241533 A | * | 8/1994 |
| JP | 2001248880 A | * | 9/2001 |

OTHER PUBLICATIONS

Santa Fe Ultra Efficient Dehumidifier (2 pgs.), Nov. 18, 2003.
The Ultra-Aire APD Air Purifying Dehumidifier Model UA-150H (2 pgs.), May 2000.
Therma-Stor Ultra-Aire APD 100V (http://www.thermastor.com/DesktopDefault.aspx?tabid=245) (2 pgs.), Nov. 18, 2003.

* cited by examiner

*Primary Examiner*—Chen-Wen Jiang
(74) *Attorney, Agent, or Firm*—Lathrop & Clark LLP

(57) ABSTRACT

A dehumidifier system is connected to an interior space of a building through supply and return ducts, either directly and/or through an HVAC system. Controllable dampers can be used to select how the dehumidifier system is connected to the interior space and the HVAC system. The dehumidifier determines the dew point of the ambient air from temperature and relative humidity measurements taken at location(s) of relative humidity and temperature sensors. Based on the determined dew point, the dehumidifier system determines whether to operate. The temperature and relative humidity sensors can be located in the interior space or within the dehumidifier, where they project into the air stream flowing through the dehumidifier. The dehumidifier system operates in response in part to blower calls to the HVAC system and controls the HVAC system and a ventilation system to distribute the dehumidified air and outside air throughout the building.

67 Claims, 16 Drawing Sheets

SYSTEMS AND METHODS FOR WHOLE-HOUSE DEHUMIDIFICATION BASED ON DEW POINT MEASUREMENTS

BACKGROUND OF THE INVENTION

1. Field of the Invention

This invention is directed to systems and methods for dehumidifying a space within an interior of a building.

2. Related Art

Various conventional systems for dehumidifying a large interior space by connecting a dehumidifier to the interior space through duct work are known. In general, such systems are commonly referred to as whole-house dehumidifier systems, because such systems often are connected to the duct work of a forced-air heating, ventilation and air conditioning (HVAC) system that extends throughout a whole house or other type of building.

For example, U.S. Pat. No. 5,598,715 discloses a by-pass dehumidifier that is connected to and receives air to be dehumidified from an HVAC system and that returns the dehumidified air back to the HVAC system. The 715 patent is incorporated herein by reference in its entirety. In the system disclosed in the '715 patent, air is withdrawn from the HVAC system at a point downstream from the furnace/air conditioning unit, such that the conditioned air from the HVAC system passes to the dehumidifier unit. After the dehumidifier removes moisture from the air received from the HVAC system, the dehumidified air is returned to a point upstream of the furnace/air conditioning unit. The system disclosed in the '715 patent uses this flow because it allows the dehumidifier to use the fan or blower of the HVAC system to drive air through the dehumidifier, as well as through the duct work leading from the HVAC system to the dehumidifier and from the dehumidifier back to the HVAC system.

To determine whether to dehumidify the air coming from the HVAC system, the system disclosed in the '715 patent measures the relative humidity within the interior space that is supplied with conditioned air by the HVAC system. In particular, depending on the value of the relative humidity of the interior space, as measured by a humidistat, relative to a predetermined control value, the system disclosed in the '715 patent either opens or closes a damper. When the damper is opened, air can flow from the HVAC system into the ductwork leading to the dehumidifier. In contrast, when the damper is closed, the dehumidifier is disengaged from the conditioned air being supplied from the furnace/air conditioner unit of the HVAC system.

Therma-Stor Products of Madison, Wis. distributes a second conventional whole-house dehumidifier system that operates in parallel with a forced-air HVAC system. In particular, this Therma-Stor system uses one or both of a dedicated duct that draws air from the interior space into the dehumidifier and a dedicated duct that draws outside air into the dehumidifier. In this Therma-Stor system, the dehumidifier has its own fan or blower that is controlled by a control panel located in an interior space that is to be supplied with dehumidified air from the dehumidifier. The dehumidified air output by the dehumidifier passes through a dedicated duct between the dehumidifier unit and the ductwork of the HVAC system. In particular, in this Therma-Stor product, the dehumidifier returns the dehumidified air to a point in the HVAC system's ductwork that is downstream from the furnace/air conditioner unit of the HVAC system. Like the system disclosed in the '715 patent, this Therma-Stor system measures the relative humidity of the air in the interior space and turns on the dehumidifier when the relative humidity in the interior space is greater than a predetermined control value. The Therma-Stor dehumidifier continues to run until the relative humidity in the interior space drops below the predetermined control value.

A third conventional dehumidifier system, also distributed by Therma-Stor, withdraws air to be dehumidified from an interior space through a dedicated duct that leads to the dehumidifier. However, unlike the previously-discussed conventional dehumidification's systems, this second Therma-Stor product does not return the dehumidified air back to the ductwork of an HVAC system or through a second duct back into the interior space. Rather, this second Therma-Stor product merely outputs the dehumidified air locally to the dehumidifier in the room in which the dehumidifier unit is placed. Thus, this third conventional dehumidification system operates by having the dehumidified air diffuse back into the other interior spaces. Like the first two conventional systems, this third conventional system also operates by measuring the relative humidity using a humidistat and controlling the operation of the dehumidifier based on the measured relative humidity.

It should also be appreciated that common portable dehumidifiers operate substantially similarly to this third conventional dehumidifier system, except that portable dehumidifiers omit the duct work entirely. Thus, portable dehumidifiers both draw from and output to their immediate ambient environment.

SUMMARY OF THE DISCLOSED EMBODIMENTS

The '715 patent discloses dehumidification systems that use the HVAC blower to provide the operative energy to force the air to be dehumidified through the dehumidifier unit itself and through the duct work between the dehumidifier and the HVAC unit. The air to be dehumidified is withdrawn from the HVAC system downstream of the air conditioning unit and the dehumidified air is returned to the HVAC system upstream of the air conditioning unit. The inventors have determined that, in the '715 system, re-evaporation of water off of the air conditioning coils into the previously dehumidified air could lower or even negate the effect of the dehumidifier. That is, the coil will have moisture on it as it actively cools the air passing through the HVAC system and for a short time thereafter. If the air conditioning coil has moisture on it, the dry, warm dehumidified air returned to the HVAC system upstream of the air conditioning coil by the dehumidifier will pass over the air conditioning coil, accelerating the evaporation of moisture from the AC coil and re-humidifying the dehumidified air.

Even if re-evaporation of water from wet coils is not significant, the inventors have recognized the system disclosed in the '715 patent has the further disadvantage that the performance of the dehumidifier is dependent on the cleanliness of the HVAC system's air filter. That is, the air filter is typically upstream of the blower 42 and downstream of the point where the outlet duct 56 from the dehumidifier 50 returns the dehumidified air to the return air plenum 28. As the air filter filters the return air entering the air handler 40, it becomes progressively clogged with filtered material. The pressure drop across the air filter thus progressively increases. As a result, the pressure drop across the dehumidifier and/or the flow rate of air through the dehumidifier change, altering the performance of the dehumidifier 50.

Moreover, the inventors have recognized different installations of the system disclosed in the '715 patent will have different overall impedances for the supply and return duct work, due to different sizes and lengths of the duct work, different numbers and locations of ducts splitting off of the supply and return plenums, and other system design aspects of the system disclosed in the '715 patent. Because the dehumidifier 50 depends on the air handler's blower and the pressure difference between the return and supply plenums, changes in system impedance will alter the performance of the dehumidifier 50. Accordingly, due to these two disadvantages, the performance of the dehumidifier 50 in the system disclosed in the '715 patent changes between different installations and over time. Thus, it is difficult to obtain consistent dehumidifier performance using the system disclosed in the '715 patent.

The Therma-Stor whole-house system has its own blower and returns the dehumidified air downstream of the furnace/air conditioning coil unit. However, because the Therma-Stor dehumidifier unit relies on its blower to distribute air from the dehumidifier into the HVAC system ductwork and thus into the interior space, the dehumidified air is often very slowly distributed by the Therma-Stor Whole-House system.

This invention provides systems and methods for efficiently dehumidifying air in an interior space of a building.

This invention separately provides systems and methods for controlling the operation of a dehumidifier.

This invention separately provides systems and methods for measuring the dew point of the air passing through a dehumidifier.

This invention further provides systems and methods for determining the dew point of the air passing through a dehumidifier.

This invention also provides systems and methods for measuring the dew point of air upstream of the dehumidifier coil.

This invention separately provides systems and methods for operating a dehumidifier in a whole-house mode.

This invention separately provides systems and methods for controllably operating both the HVAC and dehumidifier blowers.

This invention separately provides systems and methods for cycling the HVAC blower to obtain better circulation and stirring of the dehumidified air throughout the interior space.

This invention separately provides systems and methods for controllably connecting and disconnecting the dehumidifier from the duct work of a forced-air HVAC system unit.

This invention separately provides systems and methods for sampling air to be dehumidified based at least in part on service calls to the HVAC system.

In various exemplary embodiments of the dehumidifier systems and methods according to this invention, the dehumidifier system is connected to an interior space through at least one supply duct and through at least one return duct. In some exemplary embodiments, the supply and return ducts are connected directly to the interior space. In various other exemplary embodiments, the supply and return ducts are connected to a central HVAC system. In some exemplary embodiments, the dehumidifier system is indirectly connected to the interior space via the ducts of the central HVAC system. In other exemplary embodiments, the dehumidifier is connected both directly and indirectly to the interior space. In some such exemplary embodiments, controllable dampers can be used to select how the dehumidifier system is connected to the interior space.

In various exemplary embodiments, operation of the dehumidifier is controlled by measuring the dew point of the ambient air at the location of a relative humidity sensor and a temperature sensor. Based on the measured temperature and relative humidity at the sensors' location, the dew point of the air at the sensors' location is determined. Based on the determined dew point at the sensors' location, a decision is made whether to operate the dehumidifier. In various exemplary embodiments, the determined dew point is compared to a selected dew point, which, in various exemplary embodiments, is selected by the user. In various exemplary embodiments, the temperature and relative humidity sensors are located within the dehumidifier and project into the fluid flow stream of air flowing into the dehumidifier. In various other exemplary embodiments, the relative humidity and temperature sensors are located in the interior space where the dehumidifier is used to control the relative humidity.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF DRAWINGS

Various exemplary embodiments of the systems and methods according to this invention will be described in detail, with reference to the following figures, wherein.

DETAILED DESCRIPTION OF EXEMPLARY EMBODIMENTS

Figure 1:
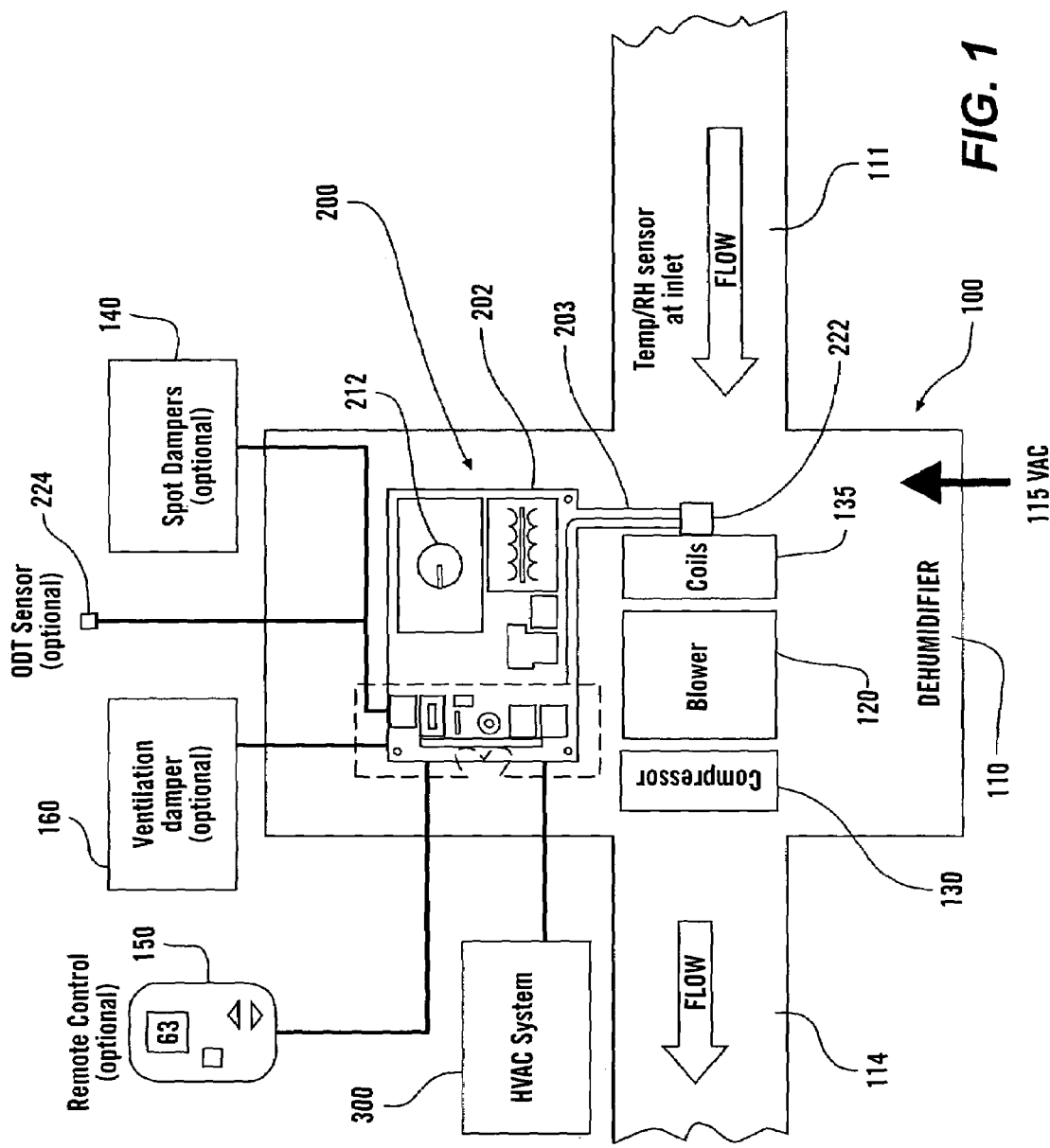
FIG. 1 is a schematic block diagram of one exemplary embodiment of a dehumidifier system and peripheral devices and structures according to this invention.

Forced-air central heating, ventilation and air conditioning (HVAC) systems typically include a furnace and air-conditioning unit that is used to increase or decrease, respectively, the temperature of a stream of air as that stream of air passes through the furnace/air conditioner unit. Downstream of the furnace/air conditioner unit, the heated or cooled air stream is directed into a main supply duct. Numerous smaller ducts branch off this main supply duct to carry the heated or cooled air to various rooms in the building containing the central HVAC system. Additionally, one or more return ducts are provided in the interior space and are used to collect air from the interior space and to provide that collected air to a main return duct that supplies the collected air stream to the heating/air conditioning unit for further heating and/or cooling. As such, such central HVAC systems are able to provide conditioned, i.e. heated and/or cooled, air throughout the whole interior space. Thus, such central HVAC systems are also referred to as whole-house systems. The incorporated '715 patent and U.S. Pat. No. 5,881,806, which is also incorporated herein by reference in its entirety, describe various exemplary embodiments of such HVAC systems.

In general, when a cooling coil of the heating and air conditioning unit is used to cool the air stream passing through the heating/air conditioning unit, the temperature of the air stream passing through the heating/air conditioning unit is typically brought to a point below the dew point of the air stream. The dew point is the temperature at which the stream of air becomes saturated with water vapor, such that water starts spontaneously condensing out of the stream of air onto any surface that is below the dew point temperature. That is, the relative humidity of the air stream becomes 100%. In particular, the heating/air conditioning unit is designed to reduce the temperature of the air stream as it passes through the heating/air conditioning unit. This cooled air is then returned to the interior space through the supply duct system. In particular, the heating/air conditioning unit is not designed to control the relative humidity of the air in the interior space. In fact, when the chilled air leaves the heating/air conditioning unit, it is typically at 90-95% relative humidity. That is, the temperature of the air stream as it leaves the heating/air conditioning unit is at or near the dew point based on the original relative humidity and temperature of the air stream returned to the heating/air conditioning unit by the return duct work. Thus, such central HVAC systems remove moisture from the air stream being conditioned and decreases overall moisture content only as a by-product of the cooling process.

However, there are many situations where a user wishes to directly control the relative humidity in a building. For example, many winter residents of Florida leave Florida and return to their summer residences farther North during the summer. Such winter residents typically turn off many of the appliances and systems in such homes during the summer. For example, because air conditioning can be terribly expensive to run, homeowners typically turn off the air conditioning portion of the HVAC systems in their homes to avoid the cost of cooling at least a portion of the interior space when no one will be present in the interior space. As a result, when the homeowner is absent from the home for extended periods during long periods of high temperature and relative humidity, the interior space of such buildings can become extremely hot and humid. Such hot, humid interior spaces can be extremely susceptible to the growth of molds, mildews and the like.

One way of combating such high levels of relative humidity in interior spaces, without using the air conditioning portion of the central HVAC system, is by using a dehumidifier. A dehumidifier, similar to an air conditioning coil, reduces the temperature of a stream of air to below its dew point, such that moisture can be removed from the air. A dehumidifier then returns the chilled air to a higher temperature. Because warmer air can hold more water vapor, heating the chilled air after moisture has been removed tends to substantially reduce the relative humidity of that dehumidified air.

Traditionally, dehumidifiers have been stand-alone units that draw in air from the ambient environment around the dehumidifier and return the dehumidified air back into that ambient environment. While such systems tend to be fairly good at removing moisture from the immediate ambient environment around the dehumidifier, they are poor at distributing the dehumidified air to places outside of the immediate environment around the dehumidifier.

Accordingly, in buildings having central HVAC systems, dehumidifiers have been connected to the HVAC system so that the dehumidified air can be better distributed to the entire interior space, e.g., the whole house. As outlined above with respect to the '715 patent and the discussed Therma-Stor systems, while such whole-house dehumidifier systems are known, they have a variety of drawbacks.

FIG. 1 shows one exemplary embodiment of a whole-house dehumidifier 100 according to this invention that is usable with a central HVAC system 300 to supply dehumidified air to an entire interior space serviced by the HVAC system. In various exemplary embodiments, such dehumidifier systems according to this invention may avoid one or more of these drawbacks. In the exemplary embodiment shown in FIG. 1, the dehumidifier system 100 includes a housing 110 that encloses a fan or blower 120, a compressor 130 and a set of coils 135. An upstream return duct 111 is used to supply a stream of air to be dehumidified to the dehumidifier system 100. A downstream dehumidified air supply duct 114 receives dehumidified air from the dehumidifier system 100. In various exemplary embodiments, as shown in FIGS. 3-11, the ducts 111 and 114 can be connected directly to the interior space, or can be so connected indirectly using the ducts of the HVAC system.

The set of coils 135 includes one or more evaporator coils and one or more condenser coils. The evaporator coils are supplied with a liquid refrigerant and remove heat from the air to be dehumidified as the liquid refrigerant evaporates within the evaporator coils. The gaseous refrigerant is returned to a liquid by the compressor 130. The heat resulting from condensing the gaseous refrigerant is dumped by the condenser coils into the atmosphere around the condenser coils. In the dehumidifier 100, the evaporator coils are used to cool the air to be dehumidified to a temperature to or below the saturation or 100% relative humidity point of the air to be dehumidified. That causes water vapor to condense out of that air, reducing the amount of water in that air. In various exemplary embodiments, the condenser coils can be placed in the airstream of the air to be dehumidified and used to reheat that air back to a desired room temperature to reduce the relative humidity of that air. However, it should be appreciated that the condenser coils do not need to be located within the airstream of air to be dehumidified by the dehumidifier 100. Rather, the condenser coils could be located within another airstream supplied to the dehumidifier, remotely from the dehumidifier, such as within another interior space of the building containing the dehumidifier 100, or even outside of that building.

As shown in FIG. 1, the dehumidifier system 100 also includes a main control system 200 that is electrically or operationally connected to the blower 120, the compressor 130 and the central HVAC system 300, and optionally to a remote dehumidifier control 150, one or more controllable spot dampers 140 that are usable to modify the flow paths to and from the dehumidifier system 100, an outside temperature sensor 224 and/or a ventilation damper 160. The structure and operation of the spot dampers 140 and the ventilation damper 160 will be described in more detail below.

A set 222 of a temperature sensor and a relative humidity sensor is part of, or is connected to, the main control system 200. In various exemplary embodiments, such as the one shown in FIG. 1, the set of temperature and relative humidity sensors 222 is located in the dehumidifier system 100 upstream of the set of coils 135. Accordingly, air to be dehumidified that is supplied by the duct 111 to the dehumidifier system 100 must first pass past the set of temperature and relative humidity sensors 222 before passing through the set of coils 135 and through the dehumidifier 100.

In various exemplary embodiments, a portion 203 of the printed circuit board 202 used to implement the control system 200 projects into the air stream upstream of the set of coils 135. In such exemplary embodiments, the set of temperature and relative humidity sensors 222 is provided on this extension 203 of the printed circuit board 202, which electrically or operationally connects the set of temperature and relative humidity sensors 222 to the control system 200 on the printed circuit board 202.

It should be appreciated that the relative locations of the blower 120, compressor 130, the set of coils 135 and the set of temperature and relative humidity sensors 222 are not critical. However, for optimal performance, the set of coils 135 should be downstream of the set of temperature and relative humidity sensors 222. Likewise, for optimal performance, the compressor 130, when located in the air stream, should be downstream of the set of coils 135. Placing the set of temperature and relative humidity sensors 222 downstream of the set of coils 135 would result in taking temperature and relative humidity readings of the dehumidified or cooled air, rather than the unconditioned air, making it difficult to get accurate measurements of the air to be dehumidified.

The compressor 130 tends to release heat into its ambient environment. Thus, if the compressor 130 needs to be cooled, it can advantageously be placed into the air stream flowing through the dehumidifier 100 downstream of the set of coils 135. If the compressor 130 is downstream of both the condenser coils and the evaporator coils of the set of coils 135, convection from the air flowing around the compressor 130 will cool the compressor 130. If the dehumidifier has only the evaporator coils of the set of coils 135 in the air stream of air to be dehumidified, the cool air from the evaporator coils can be used to cool the compressor 130. In this case, the heat from the compressor 130 also desirably reheats the cooled air to reduce its relative humidity, thus making the waste heat from the compressor 130 useful. Were the compressor to be placed upstream of the evaporator coils of the set of coils 135, the compressor 130 would add heat to the air stream at a point that would cause the cooling load on the evaporator coils to increase. If the compressor 130 were placed upstream of the set of temperature and relative humidity sensors 222, the compressor 130 would tend to cause inaccurate measurements of the relative humidity of the air to be dehumidified.

It should be appreciated that, in many types of installations for the dehumidifier 100, the dehumidifier 100 is located some distance from the interior spaces that receive the dehumidified air. As a consequence, the dehumidifier 100 often does not experience the same temperature and relative humidity conditions as that of those interior spaces. For example, when the dehumidifier 100 is installed in an attic space, the relative humidity of the air will change as the air passes through the ductwork from the interior space being conditioned to the dehumidifier 100. That is, in such attic installations, the air passing through the ductwork can be affected by heat radiating from the ductwork to such a degree that the relative humidity at the dehumidifier 100 is different from the relative humidity in the interior space to be conditioned. The inventors have discovered that such effects can be mitigated by locating the set of temperature and relative humidity sensors 222 positioned at the dehumidifier 100 in the center of the air stream and/or by controlling the operation of the dehumidifier 100 based on dew point rather than relative humidity.

As outlined in greater detail below, the control system 200 inputs the temperature and relative humidity measurements or readings from a set of temperature and relative humidity sensors, such as the set of sensors 222, a set of sensors implemented in the remote dehumidifier control 150 or some other set of temperature/relative humidity sensors. The control system 200 determines the dew point of the air to be dehumidified based on such readings. Based at least in part on the determined dew point of the air surrounding the particular set of temperature/relative humidity sensors, the control system 200 determines whether to activate the dehumidifier 100. This will be described in greater detail below. It should be appreciated that, in these sets of temperature and relative humidity sensors, the sensors are optimally located in close proximity to each other. This allows the sensors to experience and measure a single ambient environment having linked temperature and relative humidity. That is, because relative humidity is a function of temperature, it is desirable to measure the same ambient environment for temperature as for relative humidity. However, the dehumidifier 100 and the main control system 200 are still operable, perhaps with less than optimal performance, if the temperature and relative humidity are not measured at the same location.

Additionally, the above-outlined discussion refers to the temperature sensor and relative humidity sensor as separate devices. It should be appreciated that a single device containing both temperature and relative humidity sensors or a single temperature and relative humidity sensor device can be used in place of the distinct temperature and relative humidity sensors discussed herein.

Figure 2:
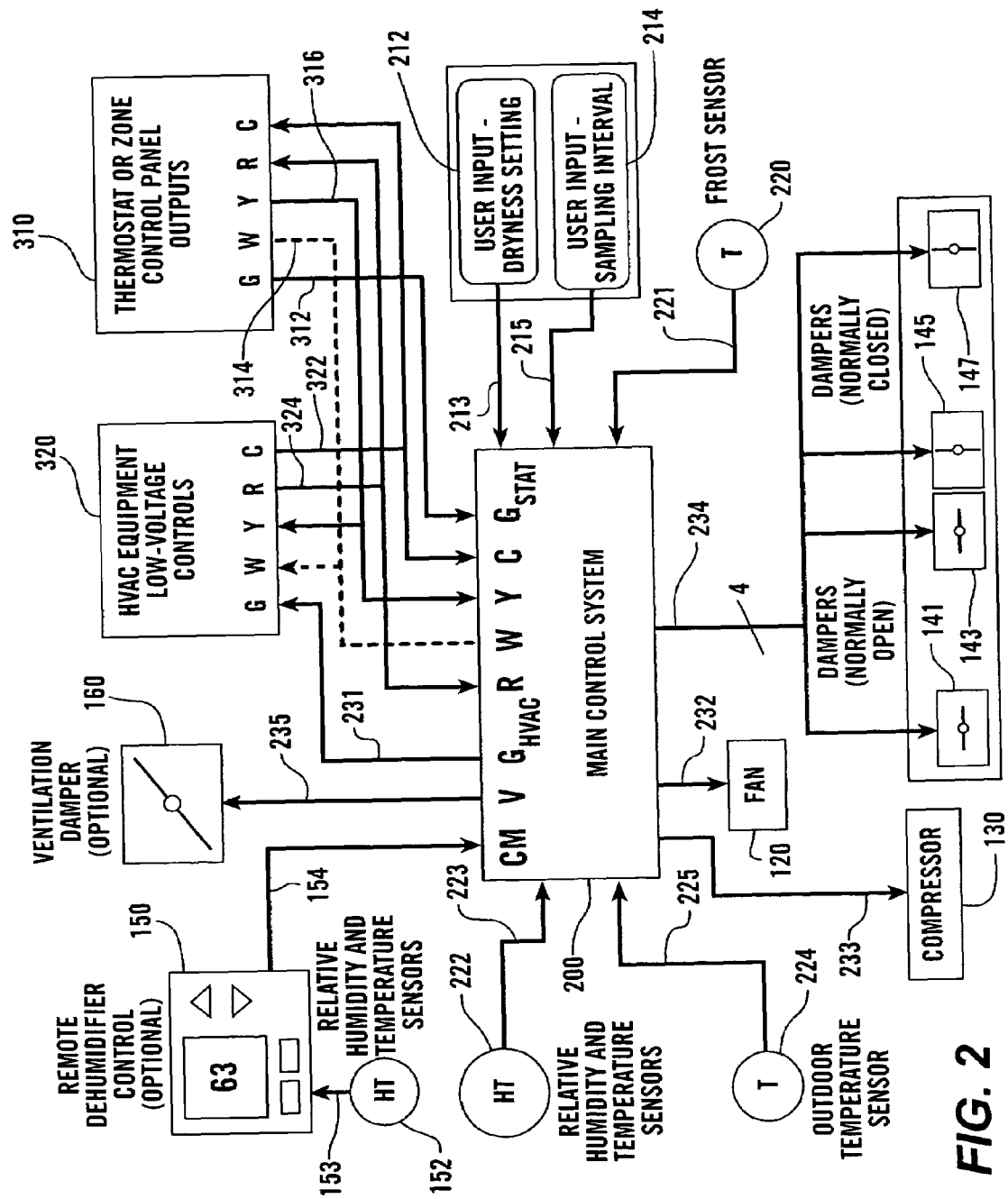
FIG. 2 is a schematic block diagram outlining one exemplary embodiment of a dehumidifier system controller and peripheral hardware structures according to this invention.

FIG. 2 outlines in greater detail one exemplary embodiment of a control system 200 according to this invention. As shown in FIG. 2, the control system 200 receives inputs from various sensors, user controls and HVAC system controls, and outputs control signals to the dehumidifier fan or blower 120, the dehumidifier compressor 130, the various dampers 140 and 160 (if implemented) and various HVAC equipment controls. In particular, as shown in FIG. 2, the control system 200 receives a dryness setting over a signal line 213 from a user input dryness setting device 212. The control system 200 also receives a sampling interval input over a signal line 215 from a user input sampling interval setting device 214. The control system 200 also contains the relays, power circuits and/or the like that are useable to drive the dehumidifier blower 120, the dehumidifier compressor 130, the HVAC blower, the ventilation damper 160, if implemented, and/or the one or more spot dampers 140, if implemented.

The user input dryness setting device 212 can be an analog or digital, rotary or linear rheostat or potentiometer, a linear slide control, a semiconductor control device, one or more switches or the like. It should be appreciated that any desired control device that is able to output a signal over the signal line 213 and which allows the user to adjust the value of the signal output over the signal line 213 can be used as the user input dryness setting device 212. The user input dryness setting device 212 allows the user to adjust the desired "dryness" of the dehumidified air. This dryness will be determined at the location(s) of the air whose properties are being sensed by the particular temperature and relative humidity sensors attached to the control system 200, such as the set of temperature and relative humidity sensors 222.

The user input air cycle interval setting device 214 can be an analog or digital, rotary or linear rheostat or potentiometer, a linear slide control, a semiconductor control device, one or more switches or any other device that allows the user to adjust the value of the user input air cycle interval output over the signal line 215 by the user input air cycle interval setting device 214 to the main control board 200. The air cycle interval selected by the user defines the length of time of the air cycle interval over which the dehumidifier 100 operates. During each air cycle interval, the dehumidifier waits for the first occurrence of particular measurement events, including a first blower call to the HVAC system or a failure to receive a blower call before the time left in the air cycle interval reaches a particular value. In response to such measurement events, the dehumidifier 200 takes a sample of the temperature and relative humidity in the air around the particular implemented set of temperature and relative humidity sensors.

In various exemplary embodiments, the user input air cycle interval setting device 214 is implemented using a set of DIP (dual-inline-package) switches to select between a number of discreet sampling intervals. The DIP switches are convenient because it is expected that the user will not often change the air cycle interval settings and because it is expected that the user will not want or need to be able to continuously vary the air cycle interval settings. It should be appreciated that the user input air cycle interval setting device 214 can also be an analog or digital, rotary or linear rheostat or potentiometer, a linear slide control, a semiconductor control device, one or more switches or the like. It should be appreciated that any desired control device that is able to output an air cycle interval signal over the signal line 215 and that allows the user to adjust the value of the air cycle interval output over the signal line 215 can be used as the user input air cycle interval setting device 214.

In various exemplary embodiments, the user input dryness setting device 212 is a rotary device. In this case, the set point range of the rotary device extends from a "less dry" set point at one end of the range to a "more dry" set point at the other end of the range. In various exemplary embodiments, the "less dry" set point is equivalent to about a 65° F. dew point, while the "more dry" set point is equivalent to about a 40° F. dew point. However, it should be appreciated that these set points can be associated with any dew point temperatures, and thus are not limited to the dew point temperatures set forth above.

If the rotary device is turned all the way to one extreme, which, in various exemplary embodiments, is past the "more dry" setting and/or is about the extreme clockwise end of the range, the control system 200 is placed into a test mode.

In this test mode, the dehumidifier blower 120 is turned on. In various exemplary embodiments, the HVAC blower is also turned on. Then, after a first test period has elapsed, the dehumidifier compressor 130 also is turned on and all components are allowed to run for an additional second test period, after which all components are turned off. In various exemplary embodiments, the first and second test periods are, respectively, about 15 seconds to about 45 seconds, and could be as long as about 130 seconds, and about 15 seconds to about 45 seconds. In various exemplary embodiments, the first and second test periods are each desirably about 30 seconds. However, it should be appreciated that any suitable time periods can be used for the first and second test periods. The first and second test periods are not limited to the time periods set forth above. If the rotary device is turned all the way to the other extreme, which, in various exemplary embodiments, is past a "less dry" setting and/or about the extreme counter-clockwise end of the range, the dehumidifier 100 is turned off.

As shown in FIG. 2, the control system 200 can receive relative humidity and temperature readings from the set of relative humidity and temperature sensors 222 over at least one signal line 223, where this set of relative humidity and temperature sensors 222 may be located locally to the dehumidifier 100. However, it should be appreciated that the set of relative humidity and temperature sensors 222 does not need to be located within, or even relatively close, to the dehumidifier 100. Thus, the set of relative humidity and temperature sensors 222 could be located at any desired distance from the dehumidifier 100, and could be located anywhere within the building or house in which the dehumidifier 100 is operating. However, in various exemplary embodiments, the set of relative humidity and temperature sensors 222 is located within the dehumidifier 100 and is located upstream of the set of coils 135 within, and ideally at the center of, the stream of air being returned to the dehumidifier 100 to be dehumidified.

Alternatively, in various other exemplary embodiments, a set of relative humidity and temperature sensors 152, which are implemented as part of, or connected to, the remote dehumidifier control 150 by at least one signal line 153, can be used in place of, or in addition to, the set of relative humidity and temperature sensors 222. In particular, the remote dehumidifier control 150 can be used not only to provide the set of relative humidity and temperature sensors 152 within a specific region of the interior space being dehumidified by the dehumidifier 100, but can also be used in place of, or in addition to, the user input dryness setting device 212 and/or the user input sampling interval setting device 214 to provide dryness setting values and/or user input sampling interval values to the control system 200 from a location remote from the dehumidifier 100. In general, the remote dehumidifier control 150, if implemented, is connected to the control system 200 by a signal line or wireless signal path 154. As shown in FIG. 2, the remote dehumidifier control 150 contains various buttons that allow a particular controllable value to be selected and buttons that allow the selected control value to be adjusted.

As indicated above, the remote dehumidifier control 150 is generally located remote from the dehumidifier 100 and is typically located within a particular subset of the space to be dehumidified, such as, for example, a room in a house that is being dehumidified using the dehumidifier 100. In contrast, the user input dryness setting device 212 and the user input sampling interval setting device 214 are typically implemented on or within the dehumidifier 100. However, it should be appreciated that the user input dryness setting device 212 and/or the user input sampling interval setting device 214 do not need to be so located, and can be located close to the dehumidifier 100, or could even be implemented remotely from the dehumidifier 100. Likewise, the remote dehumidifier control 150 could be located close to the dehumidifier 100.

As disclosed in greater detail in the incorporated '806 patent, when an outside air ventilation system, including the outside air duct 162 and the ventilation damper 160, is implemented, the air cycle interval is also the time period over which the control system 200 monitors conditions in the interior space and determines whether to operate the ventilation damper 160, and possibly other HVAC devices, to at least stir and/or refresh the air in the house, building or other interior space. In general, when the outside air ventilation system is implemented, the main control system 200 will turn on the blower of the HVAC system 300 at least once during each air cycle interval. In general, the HVAC blower will be run for a predefined time period or percentage of the air cycle interval. In operation, the main control system 200, based on thermostat or zone control panel 310 temperature readings, receives a cooling call or a heating call as appropriate, and turns on the HVAC blower and the air conditioning coil 340 or the HVAC furnace, respectively. If the outside air ventilation system is implemented, the main control system 200 also operates the damper 160 to draw outside air into the HVAC system 300.

In various exemplary embodiments, when the outside air ventilation system, including the outside air duct 162 and the ventilation damper 160, is implemented, the control system 200 also includes a ventilation time control device. The ventilation time control device is used to set the amount of time during each air cycle time interval during which the ventilation damper 160 is opened to allow ventilation air to be drawn from the outside environment 500 through the ventilation duct 162 and into the supply duct 304 of the HVAC system 300. In various exemplary embodiments, the ventilation control device is an analog or digital, rotary or linear rheostat or potentiometer, a linear slide control, a semiconductor control device, one or more switches or the like. It should be appreciated that any desired control device that is able to output a signal to the main control system 200 and that allows the user to adjust the value of the output signal can be used as the ventilation time control device. In various exemplary embodiments, the ventilation time can be varied between zero minutes and about 60 minutes. However, it should be appreciated that any particular value for the minimum and maximum time limits to be set by the ventilation control device can be used.

In various exemplary embodiments, a rotary device is used to implement the ventilation time control device. In such exemplary embodiments, the rotary device is turned to about one extreme, such as about fully clockwise, the control system 200 places the ventilation system into a test mode, where the ventilation damper 160 is held open for a predefined time period, which can extend indefinitely. In contrast, in various exemplary embodiments, if the rotary device is turned to about the other extreme, such as about fully counter-clockwise, automatic operation of the ventilation/air recycling system is turned off. In various exemplary embodiments, even if the ventilation/air recycling system does not operate automatically, the control system 200 is able to operate the ventilation damper 160 on a timed basis if the control system 200 includes a ventilation time mode and if the ventilation time mode is enabled.

The outdoor temperature sensor 224, if implemented, is used to provide a measurement of the ambient temperature of the atmosphere outside of the interior space whose relative humidity the dehumidifier 100 is used to reduce. As indicated in FIG. 2, the outdoor temperature sensor 224, if implemented, is connected to the control system 200 by a signal line 225. A frost sensor 220, which measures the presence and/or amount of frost that may have developed on the evaporator coils of the set of coils 135, is connected to the control system 200 over a signal line 221.

As shown in FIG. 2, the thermostat or zone control panel 310 of the HVAC system 300 and an HVAC equipment low-voltage control device 320 of the HVAC system 300 are connected to each other and to the control system 200 so that various signals from each of these devices can be distributed to the other two devices. In particular, the thermostat or zone control panel 310 outputs an HVAC blower control signal "G" to a "$G_{STAT}$" input of the control system 200 over a signal line 312. The thermostat or zone control panel 310 also outputs a heating call control signal "W" and a cooling call control signal "Y" to each of the HVAC equipment low-voltage control panel 320 and the control system 200. Low-voltage power input terminals "R" and "C" on each of the control system 200, the thermostat or zone control panel 310 and the HVAC equipment low-voltage control panel 320 allow low-voltage power to be supplied to these components. Finally, the control system 200 outputs an HVAC blower control signal "$G_{HVAC}$" signal over a signal line 231 to the HVAC equipment low-voltage control panel 320.

The heating call single W from the thermostat or zone control panel 310 is provided to the control system 200 to allow the control system 200 to know when the thermostat or zone control panel 310 has made a heating call to the HVAC equipment control 320 to turn on the furnace. This is useful when controlling and operating the ventilation damper 160.

The cooling call signal Y from the thermostat or zone control panel 310 is provided to the control system 200 to allow the control system 200 to know when the thermostat or zone control panel 310 has made a cooling call to the HVAC equipment control 320 to turn on the air conditioning unit 340. As described in greater detail herein, in various exemplary embodiments, the dehumidifier 100 is desirably not operated during a cooling call or for a predetermined time after the cooling call ends. By monitoring the state of the cooling call signal Y, the control system 200 can determine whether the dehumidifier should be allowed to operate or not based on the relative time proximity of the cooling call.

In various exemplary embodiments, by routing the $G_{STAT}$ signal through the control system 200 to output the $G_{HVAC}$ signal to the HVAC equipment control 320, the control system 200 can determine whether the HVAC blower is on, and, if desired, turn the HVAC blower on or off independently of the thermostat or zone control panel 310. In general, the thermostat or zone control panel 310 will output the blower call signal G along with a heating call signal W and a cooling call signal Y.

If implemented, the remote control 150 can be used to control or adjust the "more dry" and "less dry" set points for the dehumidifier system 100, turn the dehumidifier 100 on and off, and/or display the current status of the dehumidifier 100, as well as provide temperature and/or percent relative humidity measurements to the dehumidifier system 100. The remote control 150 (if implemented) can also display the current interior space percent relative humidity read by the set of temperature and relative humidity sensors 222 or 152, as well as the current dryness set point.

As outlined above, the dehumidifier 100 operates to keep the relative humidity in the interior space within acceptable limits, for example, to reduce the unwanted effects of high relative humidity. The control system 200 gathers data from the HVAC system 300 and determines the dew point of the air at the location(s) of the active set of temperature and relative humidity sensors to decide when the dehumidifier 100 should run. As described above, if implemented, the integrated ventilation subsystem operates to activate or deactivate the damper 160 to allow outside air to be brought into the interior space via the HVAC system 300. Additionally, as outlined above, the dehumidifier 100 is also able to run the HVAC blower to move air throughout the house to balance the relative humidity and temperature conditions throughout the interior space.

In various exemplary embodiments, the control system 200 is designed to provide dew point control limits between about 40° F. dew point and 65° F. dew point. For a typical thermostat setting of 70° F. to 79° F., this keeps the control range over which the controller 200 can operate very close to the American Society of Heating, Refrigerating and Air-Conditioning Engineers (ASHRAE) summer comfort range. For a default setting of approximately 50° F. dew point, this control range would keep the interior space between about 49% relative humidity and about 36% relative humidity, depending on the typical thermostat settings of between about 70° F. and about 79° F.

In operation, the control system 200 receives measurements of the temperature and relative humidity from one or more of the sets of temperature and relative humidity sensors 222 and/or 152 and/or other temperature sensors and relative humidity sensors. Based on these measurements, the control system 200 determines the current dew point temperature of the air in the environment immediately around the particular one or more sets of temperature and relative humidity sensors that are being used. Based on the determined dew point temperature, the control system 200 determines whether or not to turn on the dehumidifier compressor 130. Additionally, based on the type of installation, the control system 200 may need to determine the operational states for the various dampers 140 and 160.

It should also be appreciated that the temperature and relative humidity readings do not need to come from one of the sets of sensors 152 or 222. Rather, the temperature reading could come from any one of the temperature sensors 220 or 224, from the temperature sensor of the set of sensors 152 or 222, from the temperature sensor of the thermostat or zone control panel 310, or any other temperature sensor that may be available in the building containing the interior space or that may provide a temperature signal to the building.

Similarly, the relative humidity reading could come from the relative humidity sensor of the set of sensors 152 or 222, from a relative humidity sensor provided in the thermostat or zone control panel 310 or from any other relative humidity sensor that may be available in this building or that may provide a relative humidity signal to this building. It should also be appreciated, as outlined above, that these two sensors do not need to be placed at the same location.

When the set of temperature and relative humidity sensors 222 that is located within the dehumidifier 100 is used to measure the temperature and relative humidity, the dehumidifier 100 is effectively measuring the temperature and relative humidity in the return air of the HVAC system. The air in this portion of the HVAC system can become "stale" and thus have significantly different values for the temperature and/or the relative humidity than the air in the interior space. Therefore, the control system 200 is able to activate the dehumidifier blower 120, as well as the HVAC blower, based on the control system 200 settings.

By doing this, the set of temperature and relative humidity sensors 222 that is located within the housing 110 is likely to sample the temperature and relative humidity of air that is substantially similar in temperature and/or relative humidity to the air in the interior space. However, the main control system 200 converts the temperature and relative humidity measurements into a dew point temperature value, and determines whether to turn on the compressor 130 based on the determined dewpoint temperature and a set dew point temperature. Thus, it is not necessary that sampled air have exactly the same temperature and/or relative humidity values as the air in the interior space 400. Operation of the dehumidifier system 100 will be described in greater detail with respect to FIGS. 12-15.

FIGS. 3-11 illustrate various ones of a large number of different modes the dehumidifier system 100 can be installed in, depending on the end user's needs. However, it should be appreciated that, for these installation classes or modes, the method for sampling the air and operating the optional dampers 140 (and possibly the damper 160) works in generally the same way. In various exemplary embodiments, regardless of the type of installation, the dehumidifier 100 will generally begin sampling the temperature and relative humidity during the first HVAC blower call that occurs in a particular air cycling interval. In various exemplary embodiments, the first time after a new air cycling interval has begun that the control system 200 receives a signal over the signal line 312 from the thermostat or zone control panel 310 indicating that the HVAC blower should be turned on, the control system 200 also turns on the dehumidifier blower 120 and appropriately sets the dampers 140 (if implemented) to allow a reasonably accurate dew point measurement to be made.

In contrast, if the thermostat or zone control panel 310 has not output an HVAC call by a first predefined point in time before the end of the current air cycling interval, the control system 200 will again operate the dehumidifier blower 120 and/or the HVAC blower and take appropriate samples. In various exemplary embodiments, this first predefined point in time is three minutes prior to the end of an air cycling interval.

Of course, if the dehumidifier 100 is installed so that it is not connected to the HVAC system 300, the status of the HVAC blower may be irrelevant. That is, in some exemplary embodiments, the dehumidifier 100 does not need to turn on the HVAC blower during sampling. Rather, the control system 200 will turn on the dehumidifier blower 120 and take appropriate temperature and percent relative humidity samples without needing to determine whether or not to activate the HVAC blower.

It should be appreciated that, in various exemplary environments, if the thermostat or zone control panel 310 has not made a HVAC call by the first predefined point in time before the end of the air cycling interval, and the air cycling mode of the HVAC system 300 is enabled (i.e., the HVAC system 300 is in the "blower mode"), the control system 200 creates a "pseudo fan call" to the HVAC equipment low-voltage controls 320 over the $G_{HVAC}$ signal line 231. This causes the HVAC blower to turn on. The control system 200 then turns on the dehumidifier blower 120 and takes an appropriate temperature and relative humidity sample.

It should also be appreciated that the exemplary embodiments described above have been described assuming that the set of sensors 222 in the dehumidifier 100 would be used to take at least one of the temperature and/or relative humidity measurements. If neither one of the set of sensors 222 is used, then turning on the dehumidifier blower 120 when taking a temperature relative humidity sample can be omitted. This can also be omitted if sampling the temperature and/or relative humidity in the dehumidifier 100 or the duct 111 can be performed without regard to the status of the air that is present in the dehumidifier 100 or the duct 111.

To provide tactile feedback to the user and to demonstrate that the dehumidifier system 100 is functioning properly, if the user input dryness setting device 212 is operated to increase the set dew point temperature by a predefined amount, the dehumidifier 100 will immediately start sampling the ambient temperature and percent relative humidity. In various exemplary embodiments, this predefined amount is about ⅓ of a setting interval. In various exemplary embodiments, about ⅓ of a setting interval is equal to turning a rotary control device by at least about 10 degrees of rotation. If the dehumidifier 100 is not installed in a purely local mode, such that it is connected to the HVAC system 300, the dehumidifier 100 may also turn on the blower of the HVAC system 300, depending, for example, on whether or not the "blower mode" is enabled.

Regardless of when and why the dehumidifier 100 operates to sample the current temperature and relative humidity around the enabled set of temperature and relative humidity sensors 220, and/or 152 and/or any other implemented temperature sensors and/or relative humidity sensors, if the determined dew point temperature, as determined based on the measured temperature and relative humidity, is above the set dew point temperature, the control system 200 will turn on the dehumidifier compressor 130. The control system 200 will then run the compressor 130 for at least a second predefined time period as well as the dehumidifier blower 120. In various exemplary environments, this second time period is three minutes. Once the second time period has elapsed, and the determined dew point temperature has dropped below the set dew point temperature, the control system 200 will turn off the compressor 130 and the dehumidifier blower 120. It should be appreciated that the control system 200 determines whether the dew point has dropped below the set dew point temperature by at least periodically taking readings from the active temperature and relative humidity sensors and re-determining the present dew point temperature. Once the dew point has dropped below the set dew point temperature and the control system 200 has turned off the compressor 130 and the dehumidifier blower 120, the control system 200 will keep the compressor 130 off for at least a third predefined period. In various exemplary environments, this third predefined time period is at least two minutes. This third predefined time period is used to avoid short cycling of the dehumidifier compressor 130.

It should also be appreciated that it can be inefficient to run the dehumidifier during or even shortly after the air conditioning unit 340 of the HVAC system 300 is running or has been run. That is, during operation, the coil 340 of the air conditioning unit of the HVAC system 300 will condense a significant amount of water from the air being cooled. As noted above, when the dehumidifier 100 is operated, the blower of the HVAC system 300 may also be operated. However, in this case, because the coil 340 of the HVAC system 300 is wet, but relatively dry air is being blown over it by the HVAC blower, it is likely that the moisture on the coil 340 of the HVAC system 300 that had originally been condensed out of the air, and thus removed as humidity from the air, will be re-evaporated. This humidity will typically need to be re-removed by the dehumidifier 100. Accordingly, this is a rather inefficient use of the dehumidifier 100.

To avoid this, in various exemplary embodiments, the control system 200 does not start the dehumidifier 130 while the HVAC system air conditioning unit is running and for a fourth predefined time after the HVAC air conditioning unit stops. Once this fourth predefined time period has elapsed, the dehumidifier 100 will take appropriate temperature and percent relative humidity samples, and, if the determined dew point is above the set dew point temperature, the dehumidifier 100 will then turn on the dehumidifier compressor 130. In various exemplary environments, this fourth predetermined time period is about six minutes.

As indicated above, the dehumidifier system 100 according to this invention can be installed in a variety of different modes, depending on how the dehumidifier 100 is connected to the interior space and/or the HVAC system 300, if at all. In particular, there are three broad installation classes for the humidifier 100. These classes include a whole-house class; a local class; and a convertible class. In the whole-house class, the dehumidified air output by the dehumidifier 110 is returned to the HVAC system 300, which is used to distribute the dehumidified air throughout the entire serviced interior space, such as, for example, a whole house. In the local class, the dehumidified air is returned directly to the interior space from which it was drawn. In the convertible class, the dehumidifier 100 can be placed into either a whole-house mode or a local mode depending upon the states of various dampers 140. It should be appreciated that at least some of these classes have specific modes within them.

FIGS. 3-6 show various exemplary embodiments of specific modes of the whole-house class of installations of the dehumidifier according to this invention. In various exemplary environments, the dehumidifier 100 will pull a volume of air from an interior space 400 and/or the return duct 302 of the HVAC system 300. This volume of air passes through the dehumidifier 100, where moisture is removed from the quantity of air. The dehumidified air is then returned from the dehumidifier 100 to a supply duct 304 of the HVAC system 300 at a point that is downstream of the HVAC air conditioning coil 340. In various exemplary environments, the dehumidifier 100 pulls about 275 cubic feet per minute of air at a pressure drop across the dehumidifier 100 of 0.6 inches of water.

Figure 3:
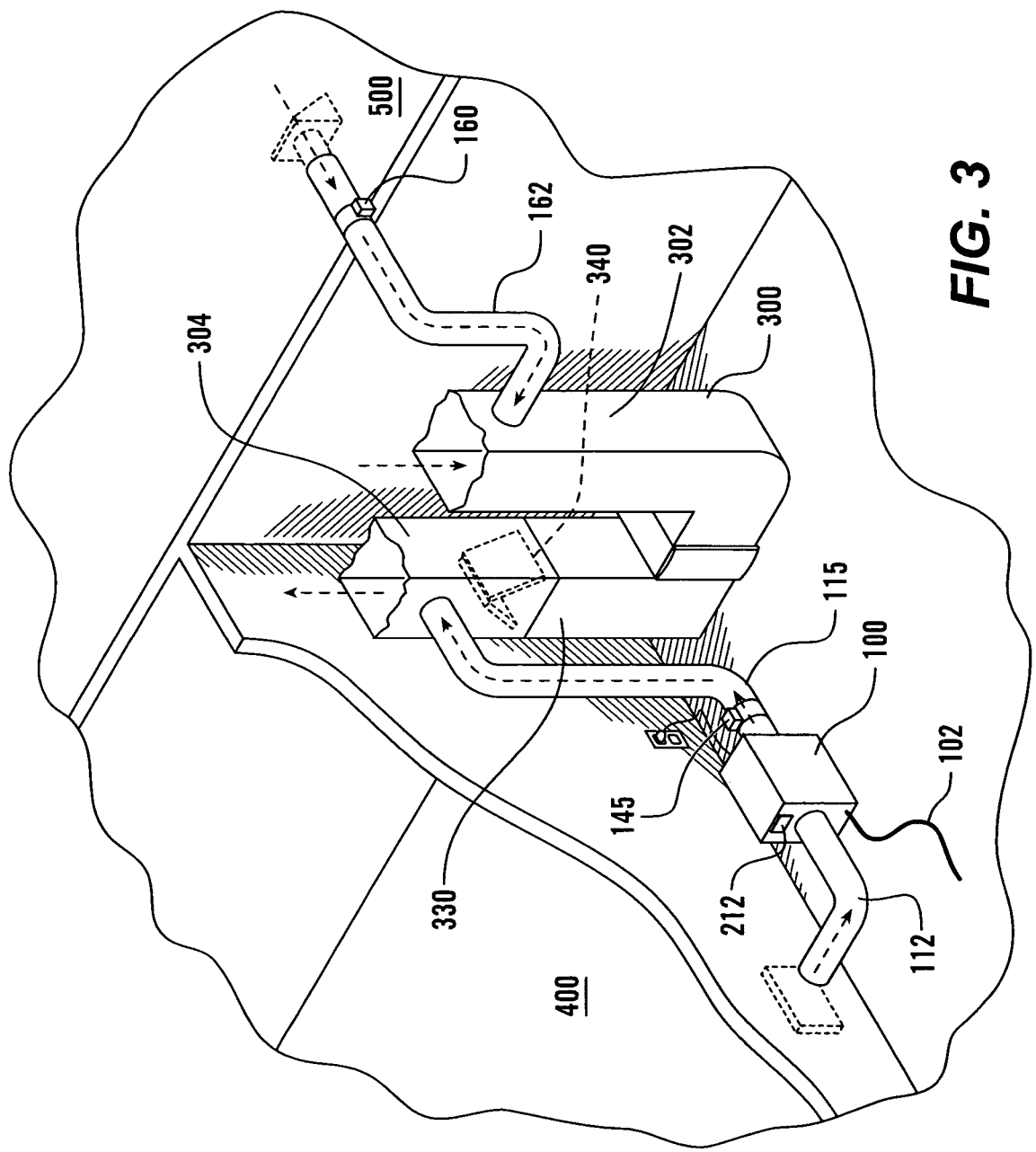
FIGS. 3 and 4 illustrate two exemplary embodiments of a first mode of implementing a dehumidifier system according to this invention.
Figure 4:
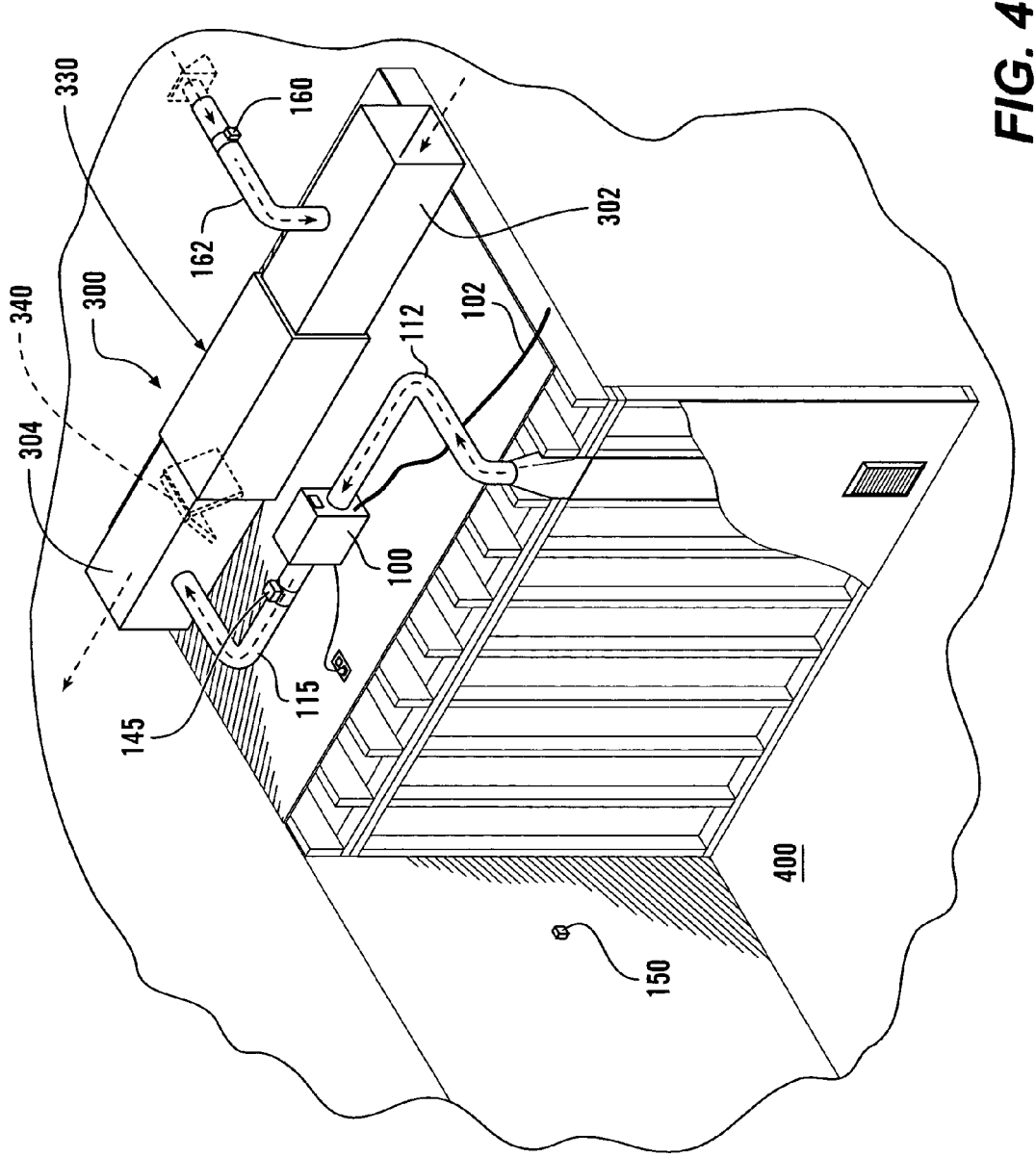

FIGS. 3 and 4 show exemplary embodiments of basement and attic installations, respectively, of a whole-house interior space-to-supply installation class for the dehumidifier 100 according to this invention. As shown in FIGS. 3 and 4, a dehumidifier return duct 112 withdraws air from the interior space 400 and provides it to the dehumidifier 100. Dehumidified air from the dehumidifier 100 then passes through a dehumidifier supply duct 115 to the supply duct 304 of the HVAC system 300 at a point that is downstream from the air conditioner coil 340. As shown in FIGS. 3 and 4, the air conditioner coil 340 is downstream of the HVAC furnace system 330.

In the exemplary embodiments shown in FIGS. 3 and 4, an optional controllable, normally-closed damper 145 is located in the dehumidifier supply duct 115. Thus, the dehumidifier 100 is normally cut off from the HVAC system 300 by the damper 145. This prevents cooled or heated air from the HVAC system 300 backflowing through the dehumidifier ducts 112 and 115 and the dehumidifier 100 and into the interior space 400. The damper 145 also prevents unconditioned air from being drawn from the interior space 400, through the dehumidifier ducts 112 and 115 and the dehumidifier 100, and into the supply duct 304 of the HVAC system 300.

As shown in FIGS. 3 and 4, if implemented, the user input/setting device 212 is mounted in or on the housing 110 of the dehumidifier 100 to allow the user to adjust the set dew point temperature to be used by the dehumidifier system 100. A drain line 102 extends from the dehumidifier 100 to allow any moisture removed and collected by the dehumidifier 100 to be drained to a point away from the dehumidifier 100.

FIGS. 3 and 4 also show the ventilation duct 162 that connects the return duct 302 of the HVAC system to the outside environment 500 and the controllable damper 160 that opens and closes the ventilation duct 162 to allow outside air to be controllably drawn from the outside environment 500 into the HVAC system 300. As noted above, when it is installed, the controllable damper 160 can be controlled by the control system 200 of the dehumidifier 100. In various exemplary embodiments, if the damper 160 is implemented, the damper 160 will be opened whenever the HVAC blower is running to allow outside air to be drawn into the interior space 400, depending on the outside temperature sensor values. This will also allow that air which may have a dew point temperature above the set dew point temperature to be at least partially dehumidified before it passes into the interior space 400.

In this whole-house interior space-to-supply mode of the dehumidifier 100, the damper 145 will be placed into an open state and the dehumidifier blower 120 will generally be turned on the first time an HVAC blower call is received in each air cycling interval to sample the temperature and relative humidity of the air within the dehumidifier return duct 112. Of course, if the optional remote dehumidifier control 150 is installed in the interior space 400, as shown in FIG. 4, the set of temperature and relative humidity sensors 152 can be used to sample the temperature and relative humidity of the air in the interior space 400 and provide the readings that are used by the control system 200 to determine the dew point temperature that will be compared with the set dew point temperature. Likewise, any other temperature sensors or any other relative humidity sensors connected to the main control board 200 can be used to provide the temperature and/or relative humidity readings. It should be appreciated that, if none of the active sensors are located within the dehumidifier 100 or the ducts 112 and 115, it is not necessary to turn on the blower 120 or open the damper 145 until the control system 200 determines that the air needs to be dehumidified. As described above, the set dew point temperature has been set by the user using the user input dryness setting device 212 or the remote dehumidifier control 150.

If the measured dew point temperature is above the set dew point temperature, the dehumidifier 100 will turn on the dehumidifier compressor 130 (and turn on the blower 120 and open the damper 145 if this has not already been done) and the dehumidifier 100 will run. In various exemplary environments, such as, for example, when the "blower on" mode is enabled, such as, for example, for air cycling, the dehumidifier 100 and possibly the HVAC blower will continue to run even after the main control system 200 receives a signal from the HVAC thermostat or zone control panel 310 that would normally turn off the HVAC blower. In general, the dehumidifier 100 and possibly the HVAC blower will continue to run until the relative humidity drops sufficiently such that the measured dew point temperature is less than the set dew point temperature. Once such a measured dew point temperature is obtained, the dehumidifier blower 120, the compressor 130 and the HVAC blower, if it is still on, are turned off and the damper 145 (if implemented) is returned to the closed state.

It should be appreciated that, in various exemplary embodiments of the dehumidifier 100 according to this invention, an offset temperature is applied to the set dew point temperature when determining whether to turn off the dehumidifier 100. That is, in such exemplary embodiments, the determined dew point temperature must not only be below the set dew point temperature, but must be below the set dew point temperature by at least the offset temperature. In various exemplary embodiments, this offset temperature is 1.5° F. dew point. This offset temperature tends to avoid short cycling operation of the dehumidifier 100.

If an air conditioning call is received while the dehumidifier 100 is running, the dehumidifier 100 will continue to run. The air conditioning unit, including the air conditioning coil 340, will also run. However, in this exemplary embodiment, because the dehumidifier supply duct 115 connects to the supply duct 304 of the HVAC system 300 at a point which is downstream of the air conditioner coil 340, the dehumidified air will not pass over wet air conditioning coils and become re-humidified, as in some prior art systems. Similarly to that outlined immediately above, if the thermostat or zone control panel 310 instructs the HVAC system 300 to turn off the air conditioning unit, the dehumidifier 100 and the HVAC blower will continue to run until the measured dew point temperature is below the set dew point temperature. However, in various exemplary embodiments, when the HVAC air conditioning unit is turned off, the HVAC fan will also be turned off, even though the dehumidifier 100 continues to run.

Figure 5:
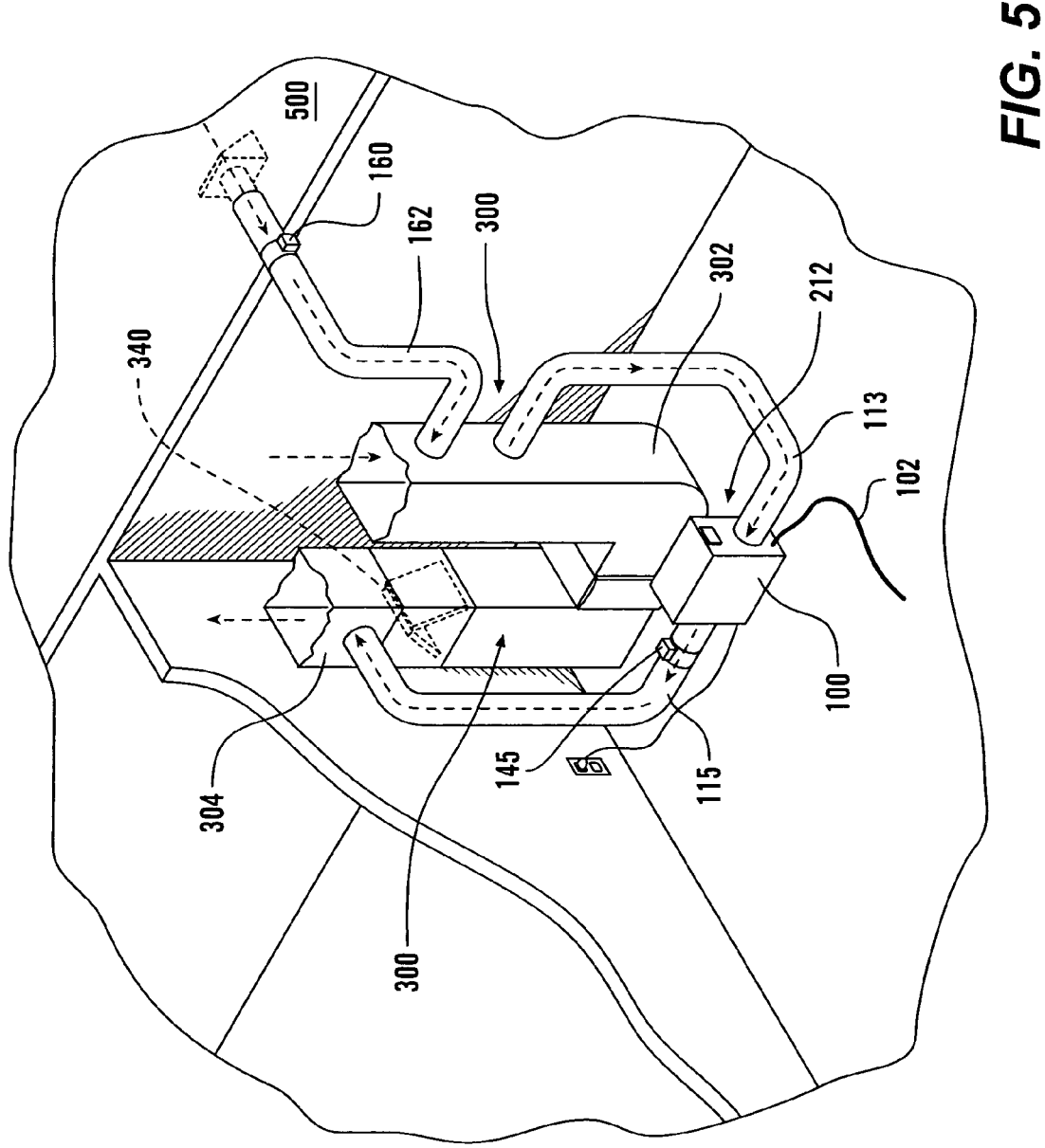
FIGS. 5 and 6 illustrate two exemplary embodiments of a second mode of implementing a dehumidifier system according to this invention.
Figure 6:
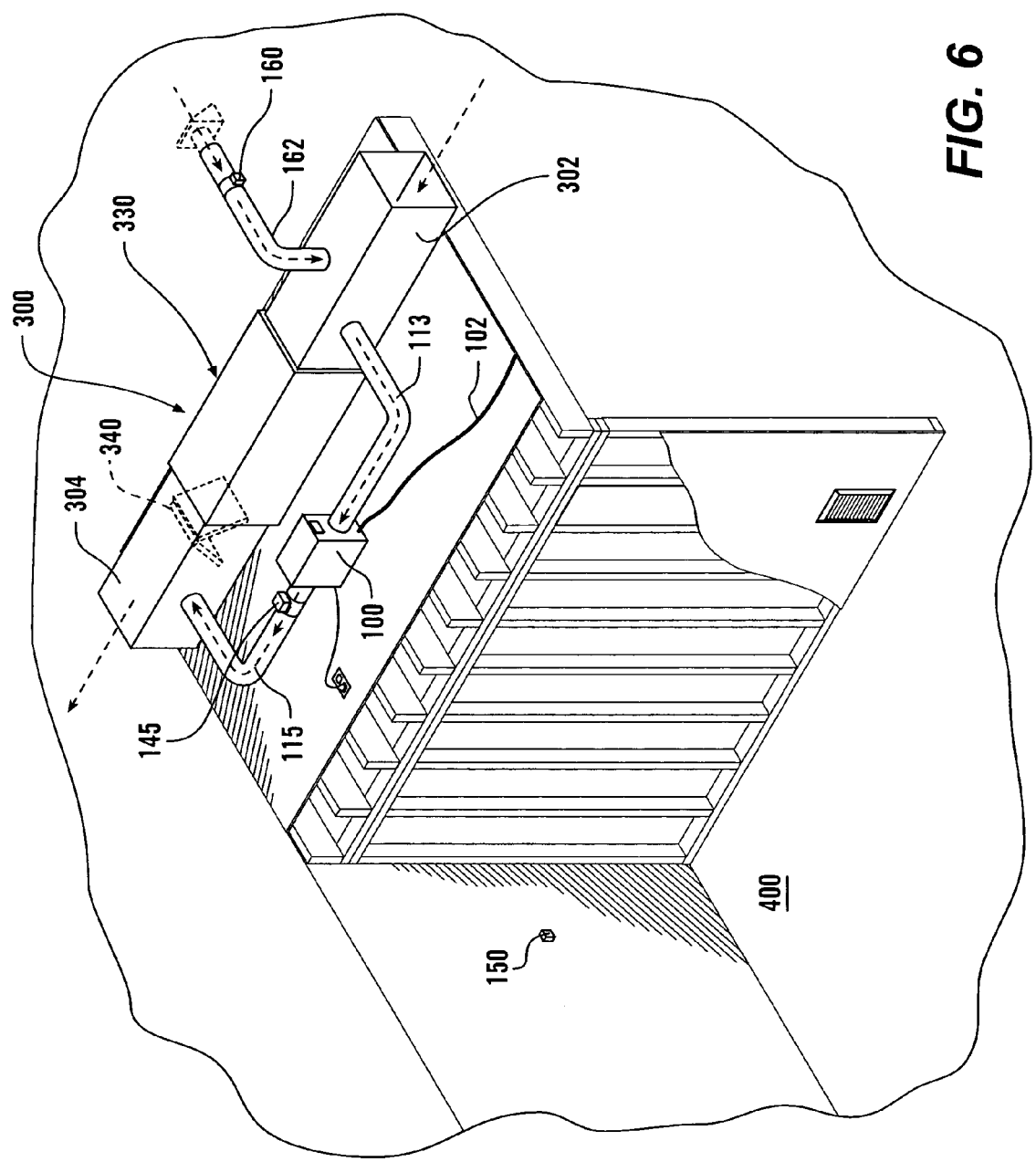

FIGS. 5 and 6 show basement and attic embodiments, respectively, of a whole-house, return-to-supply mode of the whole-house class of installations for the dehumidifier 100 according to this invention. In the exemplary embodiments shown in FIGS. 5 and 6, rather than using the interior space-to-dehumidifier return duct 112, as in the embodiments shown in FIGS. 3 and 4, a dehumidifier return duct 113 takes air from the return duct 302 of the HVAC system 300 and supplies it to the dehumidifier 100. However, in most other structural respects, the exemplary embodiments shown in FIGS. 5 and 6 are generally similar to the corresponding exemplary embodiments shown in FIGS. 3 and 4, respectively.

In operation, in this whole-house, return-to-supply mode, the dehumidifier 100 will turn on and sample the current temperature and relative humidity. The dehumidifier 100 will turn on the blower 120 and open the normally-closed damper 145 if the dehumidifier 100 uses the set of local temperature and relative humidity sensors 222. Alternatively, the dehumidifier 100 can use the set of relative humidity and temperature sensors 152 implemented in the optional remote control 150, or can use some other temperature sensor and/or some other relative humidity, or some combination of these temperature sensors and relative humidity sensors, to sample the air and determine the dew point temperature. In this case, the dehumidifier 100 does not need to turn on the blower 120 or open the damper 145. The dehumidifier 100 will begin sampling in response to the first HVAC blower call received from the thermostat or zone control panel 310 during each air cycling time interval. If the dew point determined by the dehumidifier 100 is above the set dew point temperature, the control system 200 will turn on the dehumidifier compressor 130 (and turn on the blower 120 and open the damper 145 if this has not already been done) and run the dehumidifier 100 until the measured and calculated dew point is below the set dew point temperature.

It should be appreciated that, in various exemplary embodiments of this mode, when the "blower on" mode is enabled, the HVAC blower will run whenever the dehumidifier 100 has turned on the dehumidifier blower 120. In general, this will be whenever the dehumidifier blower 120 is pulling air through the dehumidifier 100, for example, to take a sample using the set of temperature and the relative humidity sensors 222 and/or to dehumidify the air drawn from the interior space 400. It should also be appreciated that, in various exemplary embodiments, the damper 160 that opens and closes the outside air duct 162 between the outside environment 500 and the return duct 302 of the HVAC system 300 will be controllably operated by the control system 200 during those time intervals where the HVAC blower is running.

Figure 7:
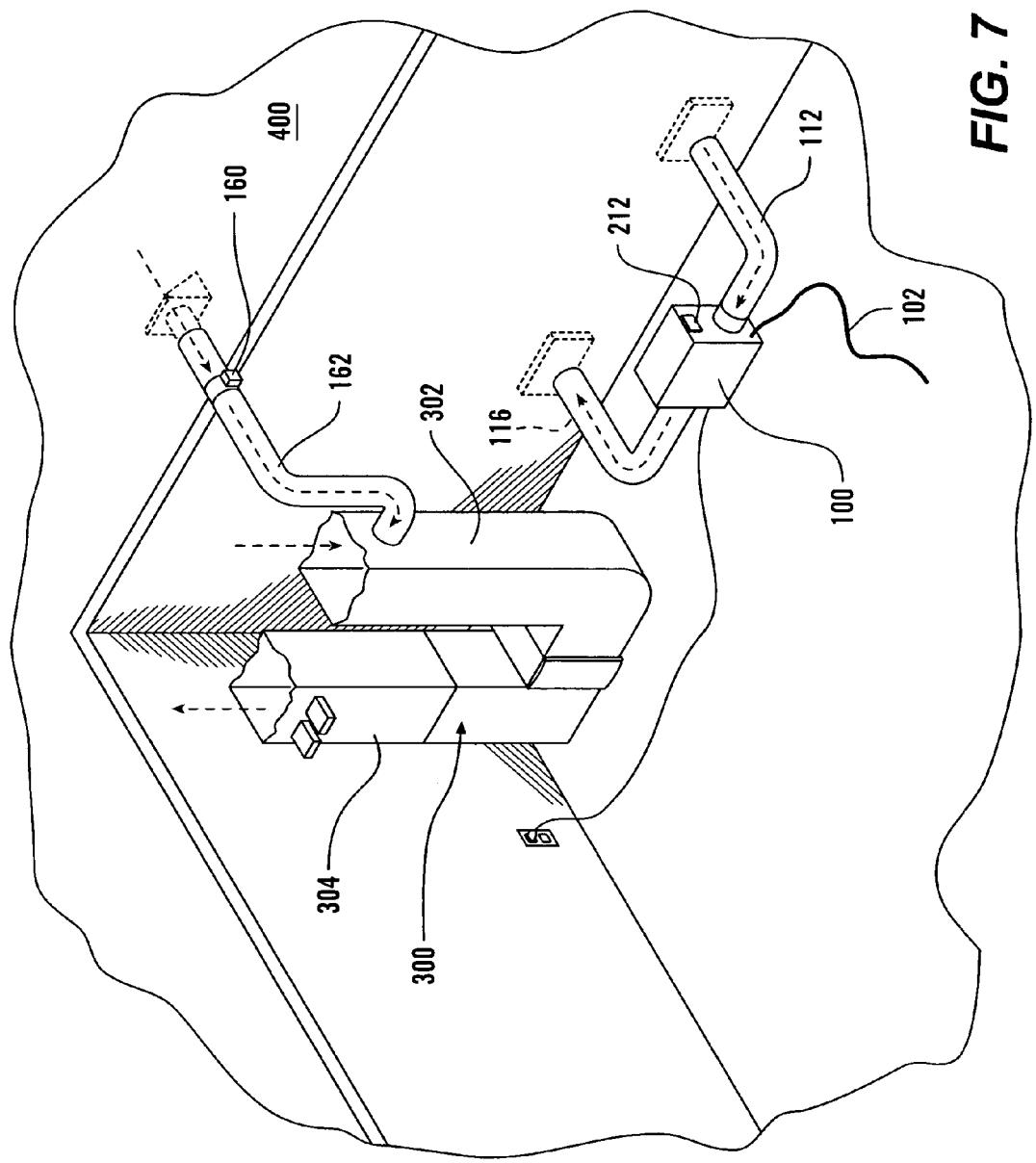
FIG. 7 illustrates one exemplary embodiment of a third mode of implementing a dehumidifier system according to this invention.

FIG. 7 shows one exemplary embodiment of a local mode or installation class for the dehumidifier 100. As shown in FIG. 7, the dehumidifier 100 is separately ducted from the HVAC system 300. However, the main control system 200 continues to control both the HVAC system 300 and the dehumidifier 100. In particular, in a local mode installation, the dehumidifier 100 is connected directly to the interior space 400 on both the input and output sides. That is, as shown in FIG. 7, as in FIGS. 3 and 4, the return duct 112 is connected between the interior space 400 and the dehumidifier 100 and supplies air to be dehumidified directly from the interior space 400 to the dehumidifier 100. Similarly, a dehumidifier supply duct 116 is connected directly between the dehumidifier 100 and the interior space 400 and supplies dehumidified air directly from the dehumidifier 100 to the interior space 400. That is, the dehumidifier 100 pulls air directly from the interior space 400, and the air passes through the dehumidifier 100, where moisture is removed. The dehumidified air is then returned directly to the interior space 400. It should be appreciated that, in various exemplary embodiments, the HVAC system 300 can be used to move this dryer air from the interior space 400 throughout the rest of the building or other interior space that is serviced by the HVAC system 300.

The HVAC system 300 can be controllably operated by the main control system 200, independently of the control signals from the thermostat or zone control panel 310 to move the dryer air from the interior space 400 to the rest of the building serviced by the HVAC system 300. In particular, the main control system 200 controllably operates the HVAC blower. Nevertheless, it is generally advantageous to run the dehumidifier 100 at the same time that the HVAC system 300 is running due to a cooling or heating call, even though there is no physical connection between the dehumidifier system 100 and the HVAC system 300. Thus, in various exemplary embodiments, in the local mode installation shown in FIG. 7, the dehumidifier 100 will turn on in response to the first HVAC blower call received from the HVAC thermostat 310 in each air cycling time interval.

As in the previously-discussed embodiments, the dehumidifier 100 samples the temperature and relative humidity and determines the dew point of the air in the interior space 400. As discussed above, the dehumidifier 100 can use the temperature and relative humidity sensors 222 within the dehumidifier 100 or remotely located temperature and relative humidity sensors, such as the sensors 152 located within the optional remote control 150, or a combination of local and remotely located sensors. If one or more local sensors are used, the control system 200 turns on the blower 120. If the dew point is above the set dew point temperature, the dehumidifier 100 turns on the compressor 130 and the blower 120 if it is not already running. Even if the HVAC thermostat or zone control panel 310 should send a signal turning the HVAC blower off, the dehumidifier 100 will continue to run until the determined dew point is at or below the set dew point temperature.

However, it should be appreciated that, in this local mode installation shown in FIG. 7, the dehumidifier 100 can operate independently of the HVAC system 300. Thus, in various other exemplary embodiments, the dehumidifier 100 takes samples of the relative humidity and temperature and determines the dew point temperature independently of the operation of the HVAC blower. If the determined dew point temperature is above the set dew point temperature, the dehumidifier 100 can run to dehumidify the air in the interior space 400 independently of the state of operation of the HVAC system 300.

Figure 8:
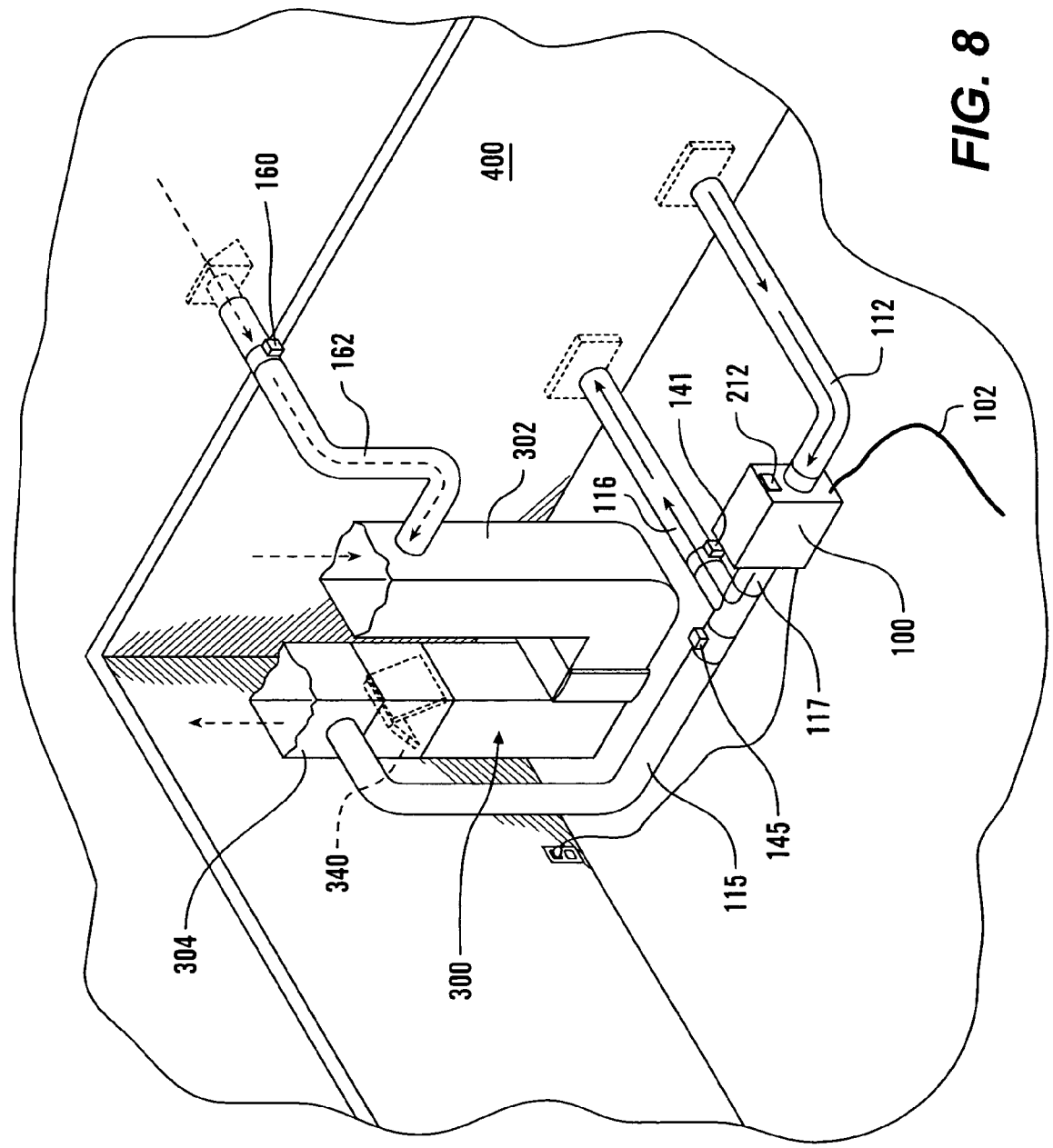
FIGS. 8 and 9 illustrate two different modes of operation of one exemplary embodiment of a fourth mode of implementing a dehumidifier system according to this invention.
Figure 9:
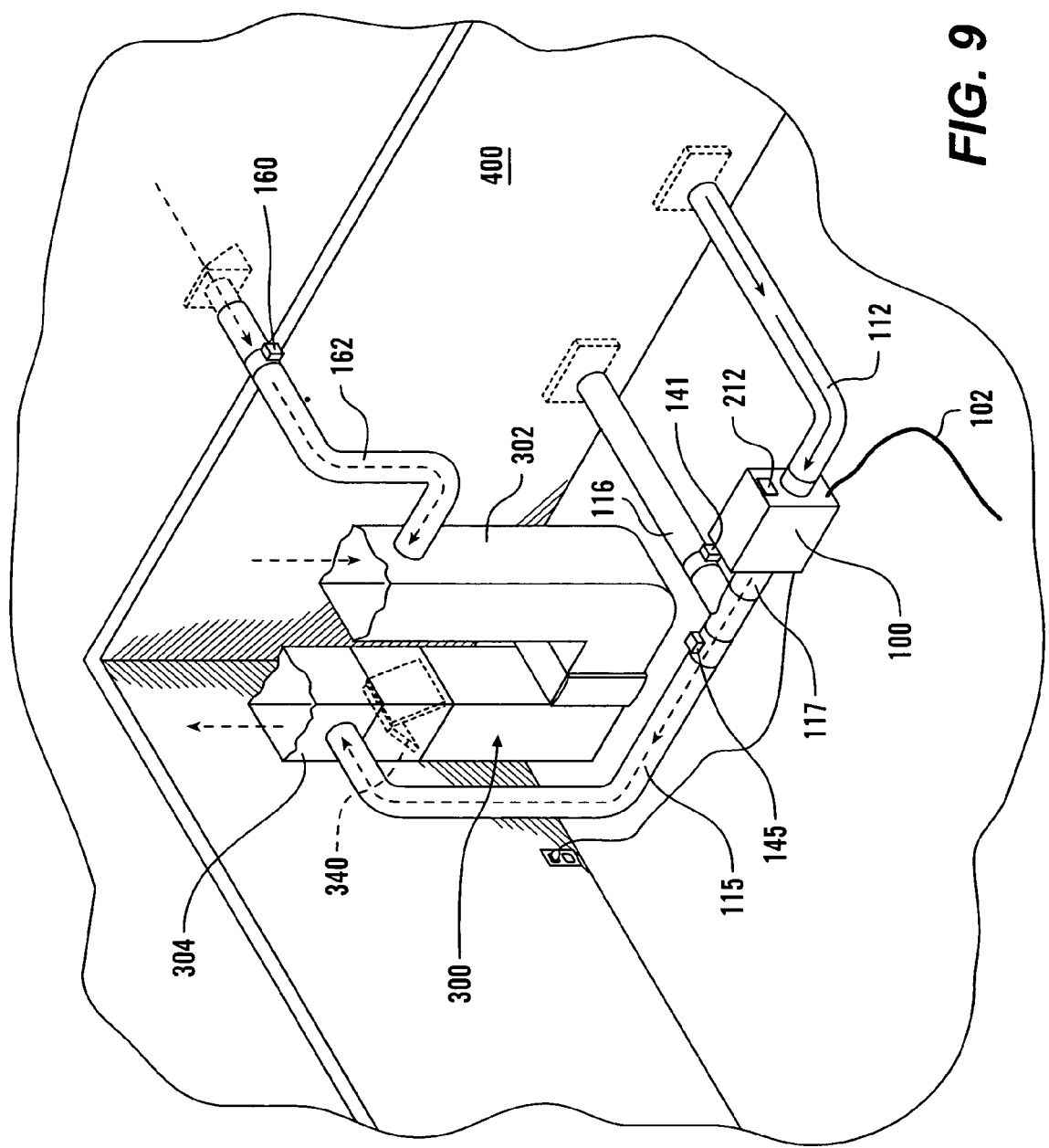

FIGS. 8-11 show two different exemplary embodiments of basement installations of a whole-house convertible installation class for the dehumidifier 100 according to this invention. In particular, FIGS. 8 and 9 show one exemplary embodiment of this whole-house convertible installation class that uses the interior space-to-dehumidifier duct 112 shown in FIGS. 3 and 7 as the return duct 111. This installation of the dehumidifier 100 also uses, as the supply duct 114, a common supply duct portion 117 leading from the dehumidifier 100 that branches into the supply duct portion 115 that connects to the supply duct 304 of the HVAC system 300 downstream of the air conditioning coil 340, similarly to that shown in FIGS. 3 and 5, and the interior space supply duct 116, similarly to that shown in FIG. 7. However, in contrast to the installations shown in FIGS. 3, 5 and 7, in the installation shown in FIGS. 8 and 9, a normally-open damper 141 is installed in the interior space supply duct 116 between the common supply duct portion 117 and the interior space 400. The normally-closed damper 145 installed in the supply duct 115 between the common supply duct portion 117 and the supply duct 304 of the HVAC system 300 continues to be used.

In general, this installation of the dehumidifier 100 operates similarly to the local installation of the dehumidifier 100 shown in FIG. 7 when in a local mode of operation. In various exemplary embodiments, this local mode is the default mode for this installation, as shown in FIG. 8. That is, because the damper 141 is normally open, while the damper 145 is normally closed, when these dampers are not operated or energized, the dehumidified air leaving the dehumidifier 100 is directed from the common supply duct portion 117 into the interior space supply duct 116 and supplied to the interior space 400. In contrast, when the convertible installation shown in FIGS. 8 and 9 is in a whole-house mode, as shown in FIG. 9, this installation is similar in operation to the whole-house interior space-to-supply installation shown in FIG. 3.

In various exemplary embodiments, the dehumidifier 100 in this installation shown in FIGS. 8 and 9 will operate in the local mode when the dehumidifier 100 begins to operate and the HVAC blower is off. In contrast, if the HVAC blower is on when the dehumidifier 100 begins to sample the temperature and relative humidity, when the control system 200 turns on the dehumidifier blower 120, the control system 200 also energizes both the normally-open damper 141 to place it in the closed position and the normally-closed damper 145 to place it in the open position.

As a result, as shown in FIG. 9, air to be dehumidified and withdrawn from the interior space 400 through the interior space return duct 112, after passing through the dehumidifier 100, passes through the common supply duct portion 117 and the supply duct 115 to the supply duct 304 of the HVAC system 300. Consequently, because the HVAC system 300 is already operating to redistribute the air in the building, the dehumidifier 100 takes advantage of this operation of the HVAC system 300 to better distribute the dehumidified air into the serviced interior space using the HVAC supply duct 304. In contrast, in the local mode shown in FIG. 8, when the HVAC system 300 is not operating, because such dehumidified air, if returned to the supply duct 304, would be pushed through the HVAC ductwork only by the operation of the dehumidifier blower 120, the dehumidified air is instead supplied directly to the interior space 400.

Figure 10:
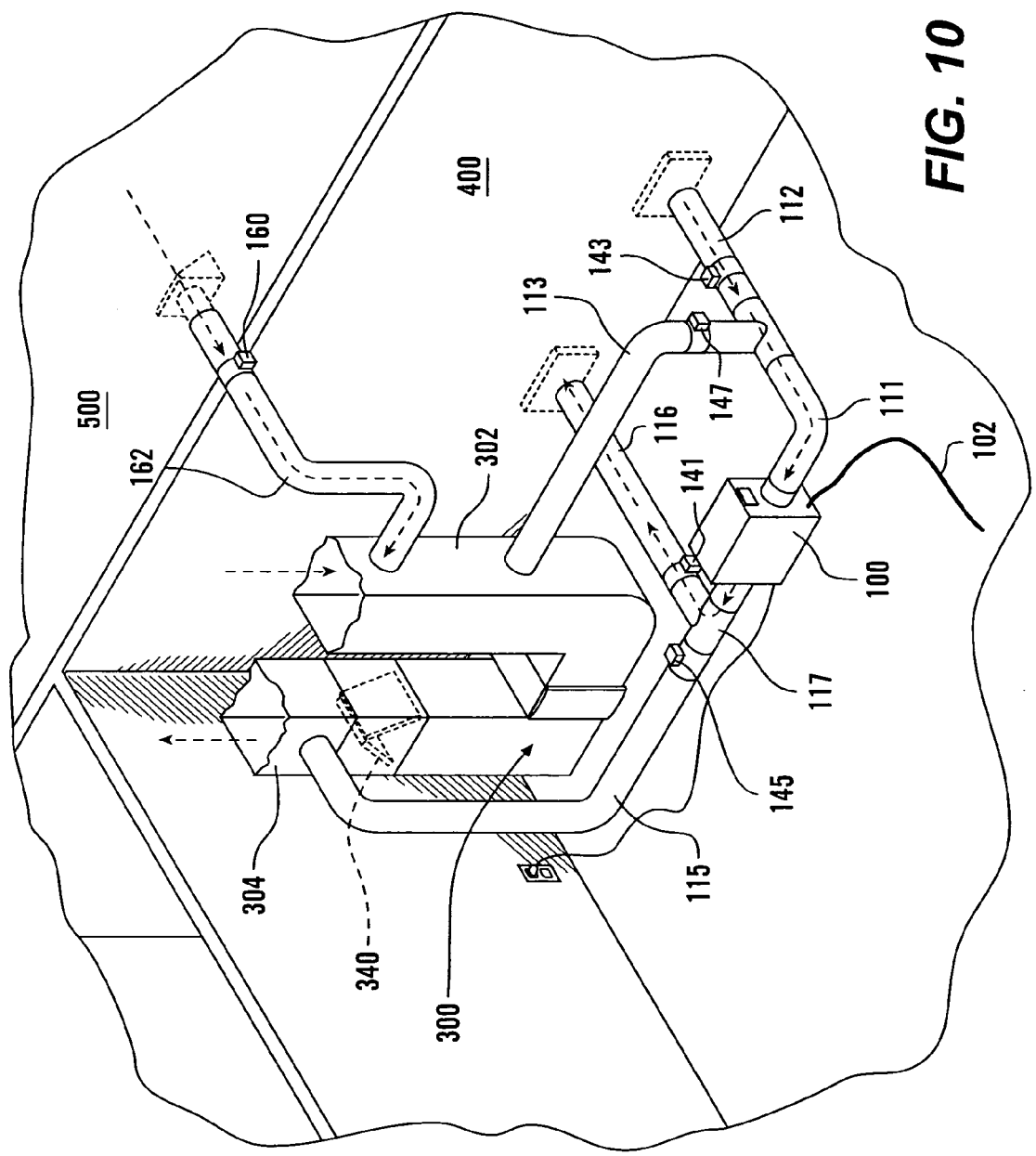
FIGS. 10 and 11 illustrate two different modes of operation of one exemplary embodiment of a fifth mode for implementing a dehumidifier system according to this invention.
Figure 11:
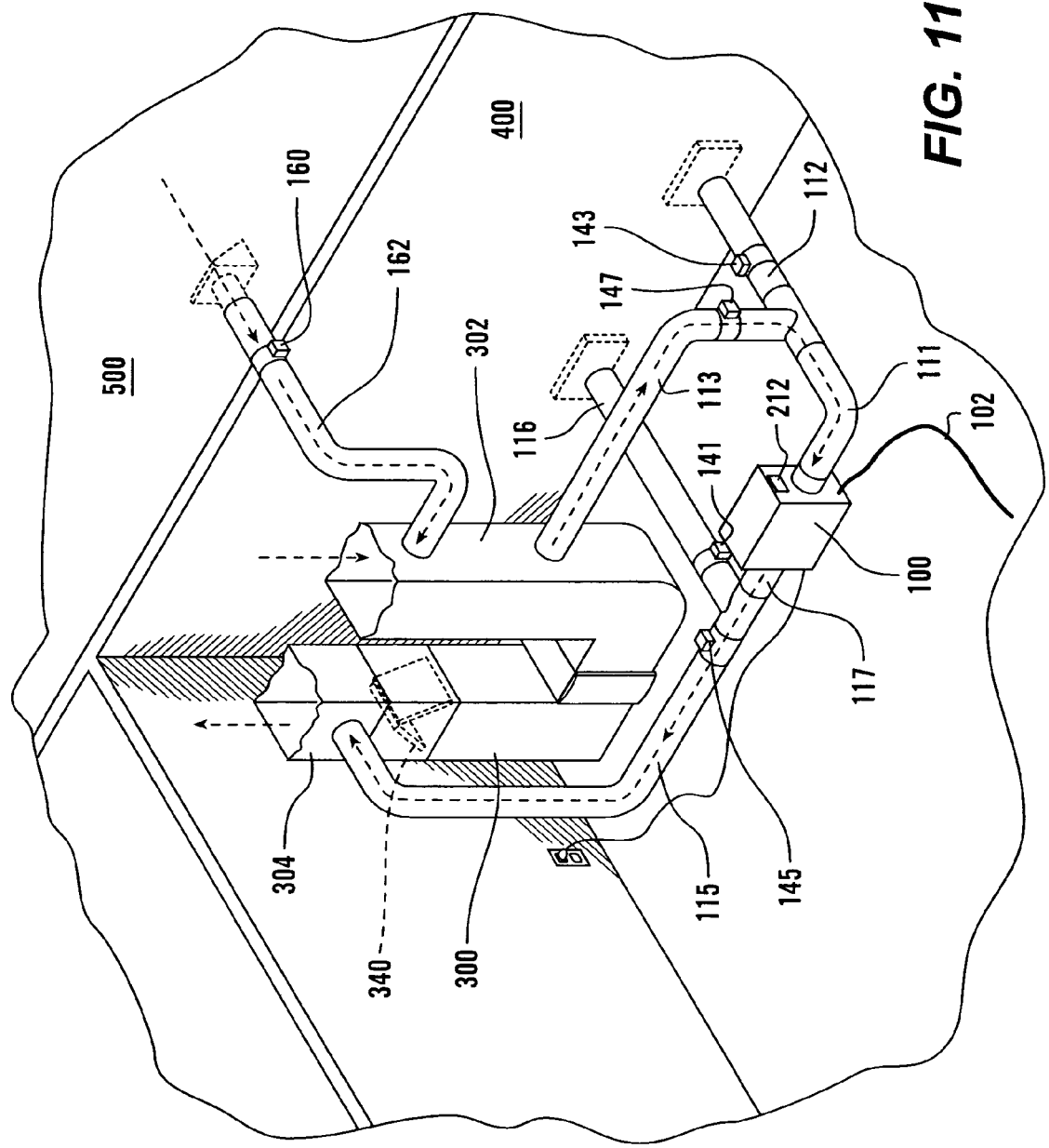
Figure 12:
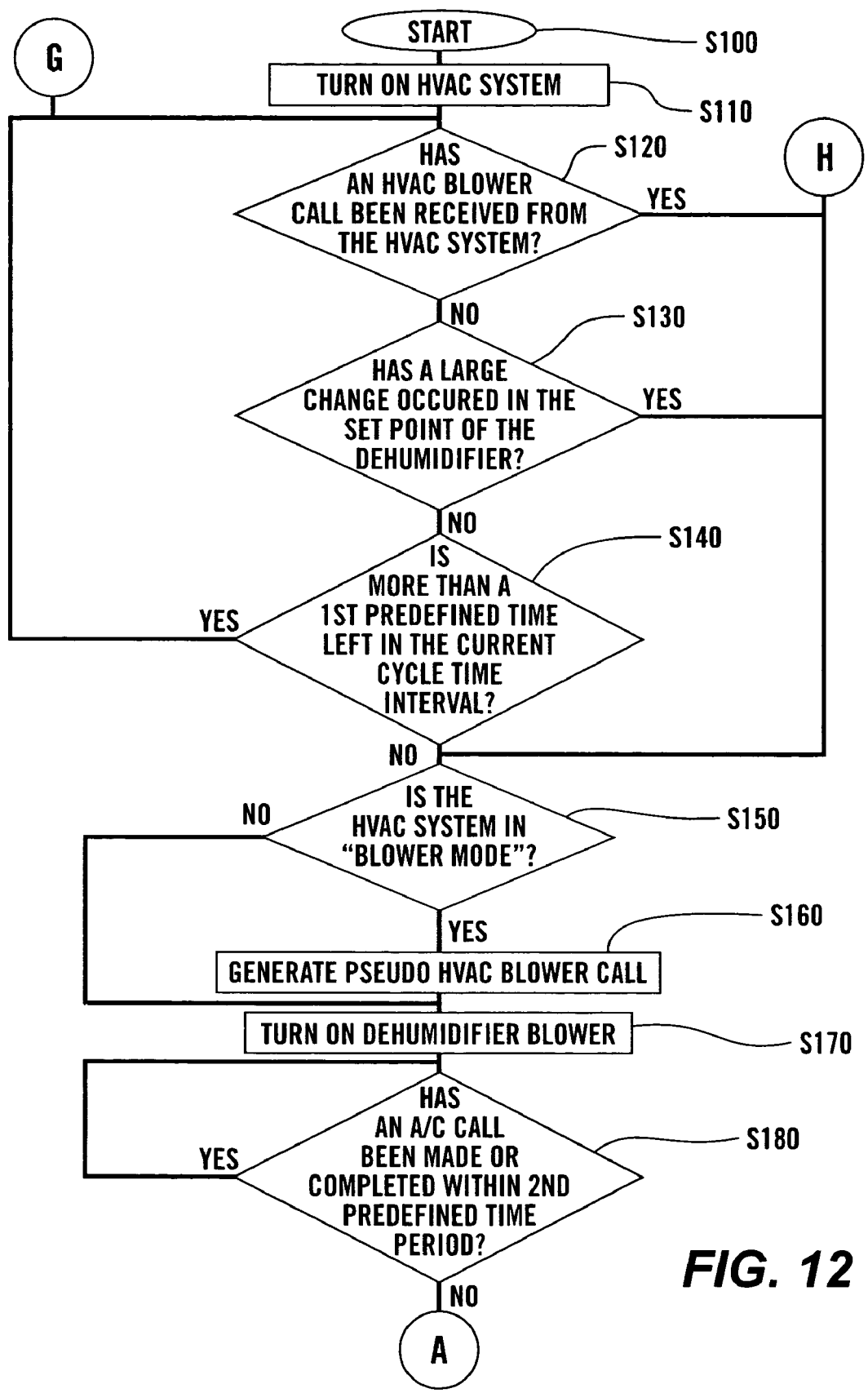
FIGS. 12-16 are a flow chart outlining one exemplary embodiment of a method for operating a dehumidifier system according to this invention.
Figure 13:
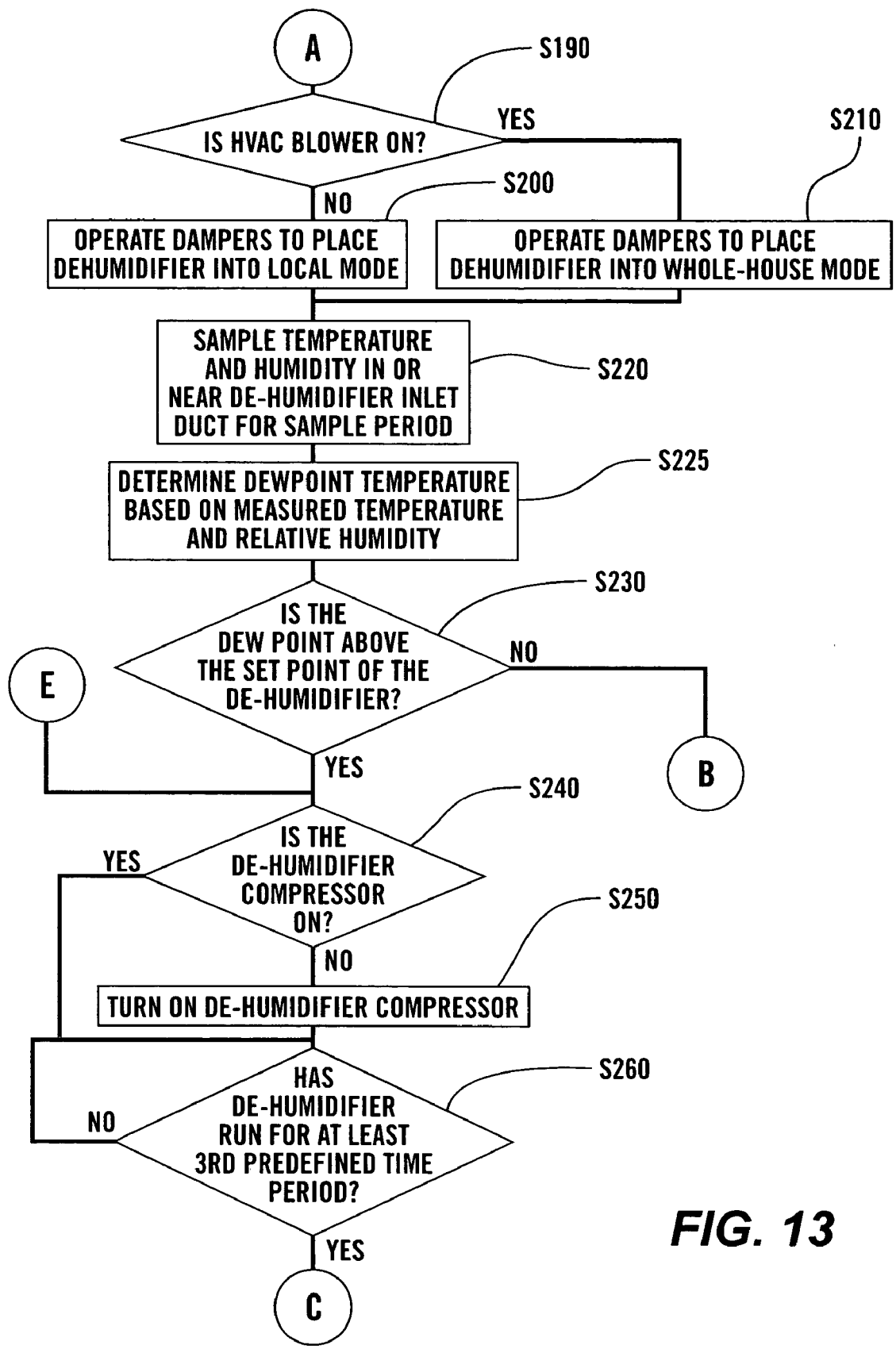
Figure 14:
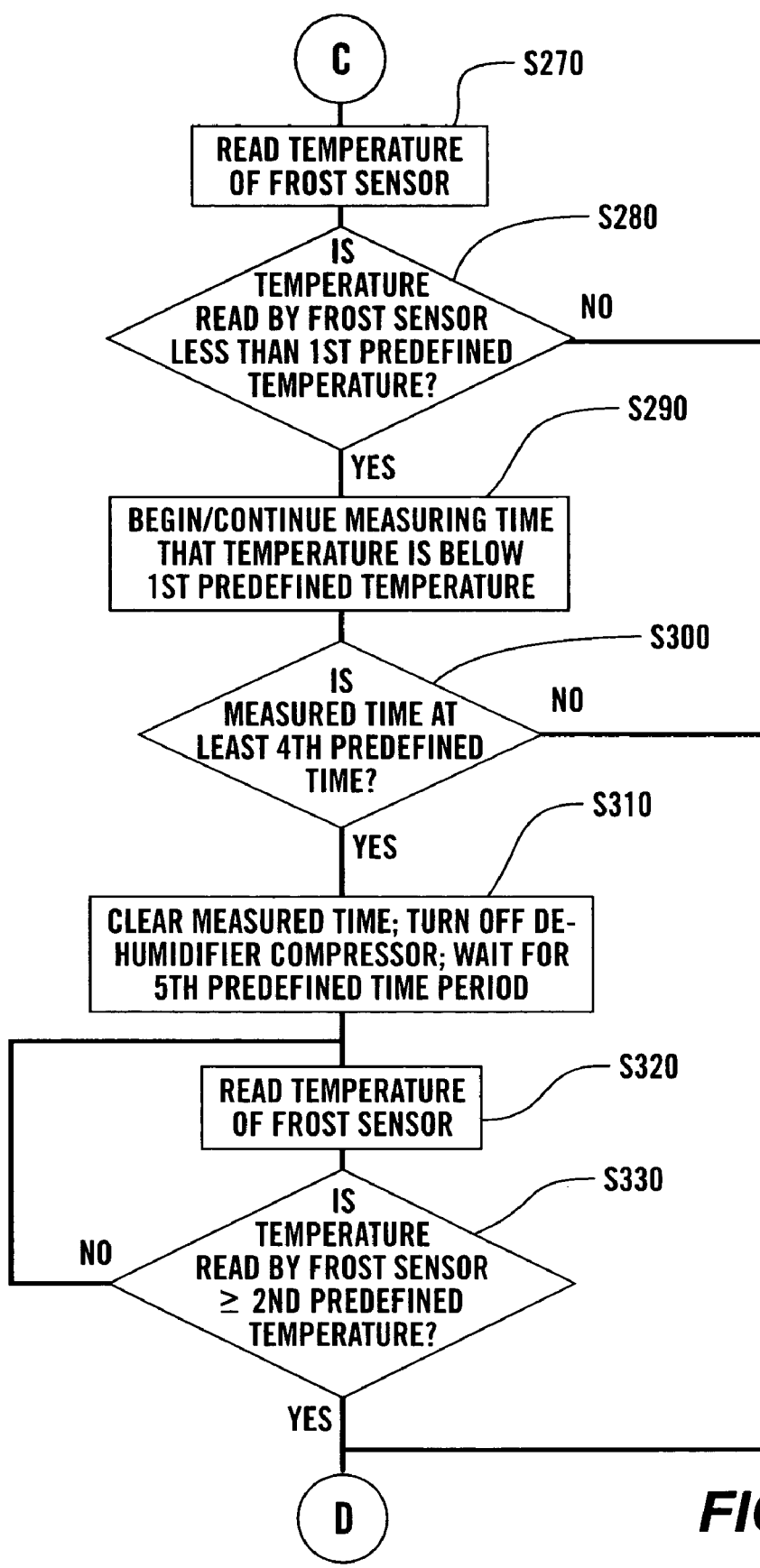
Figure 15:
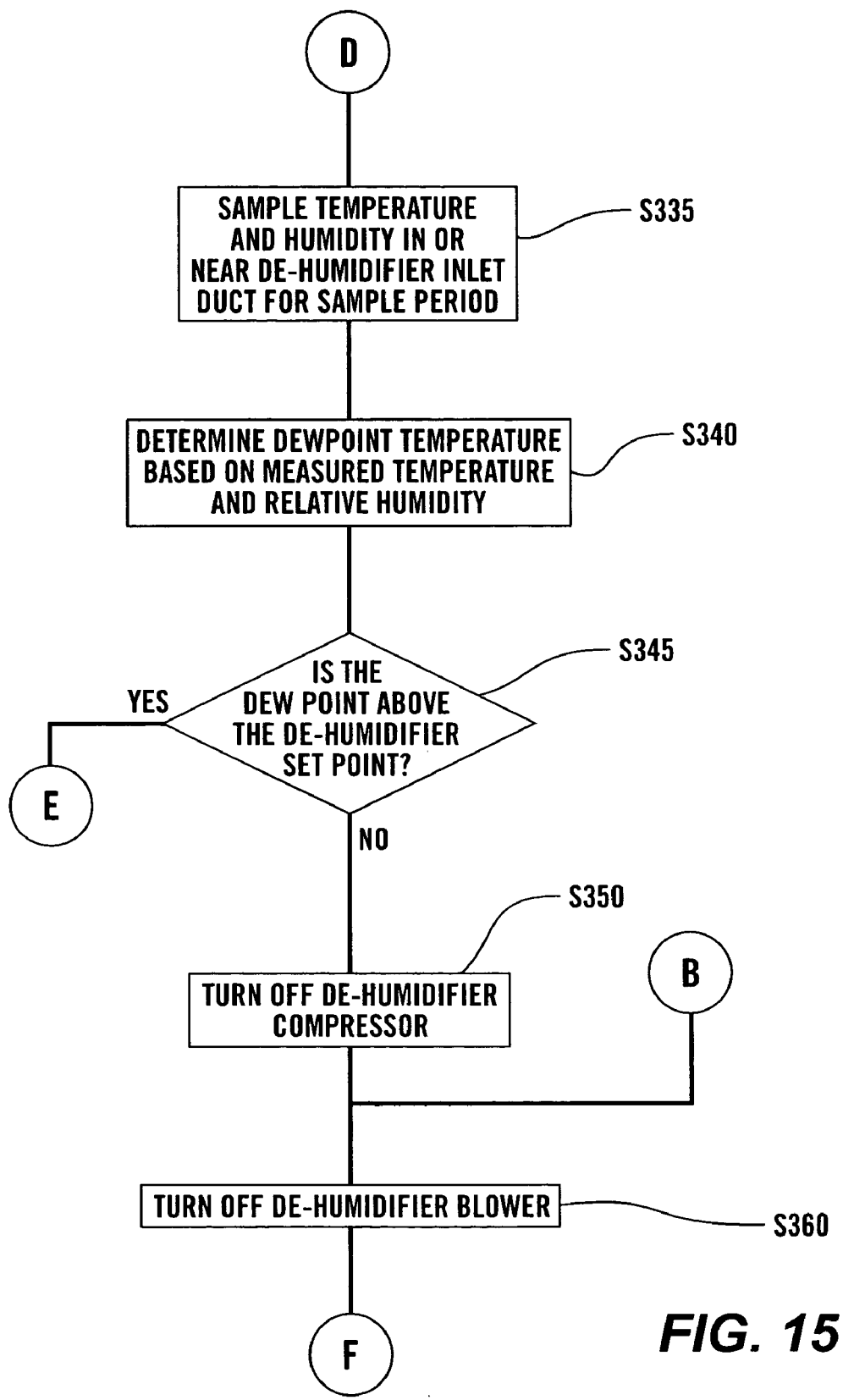
Figure 16:
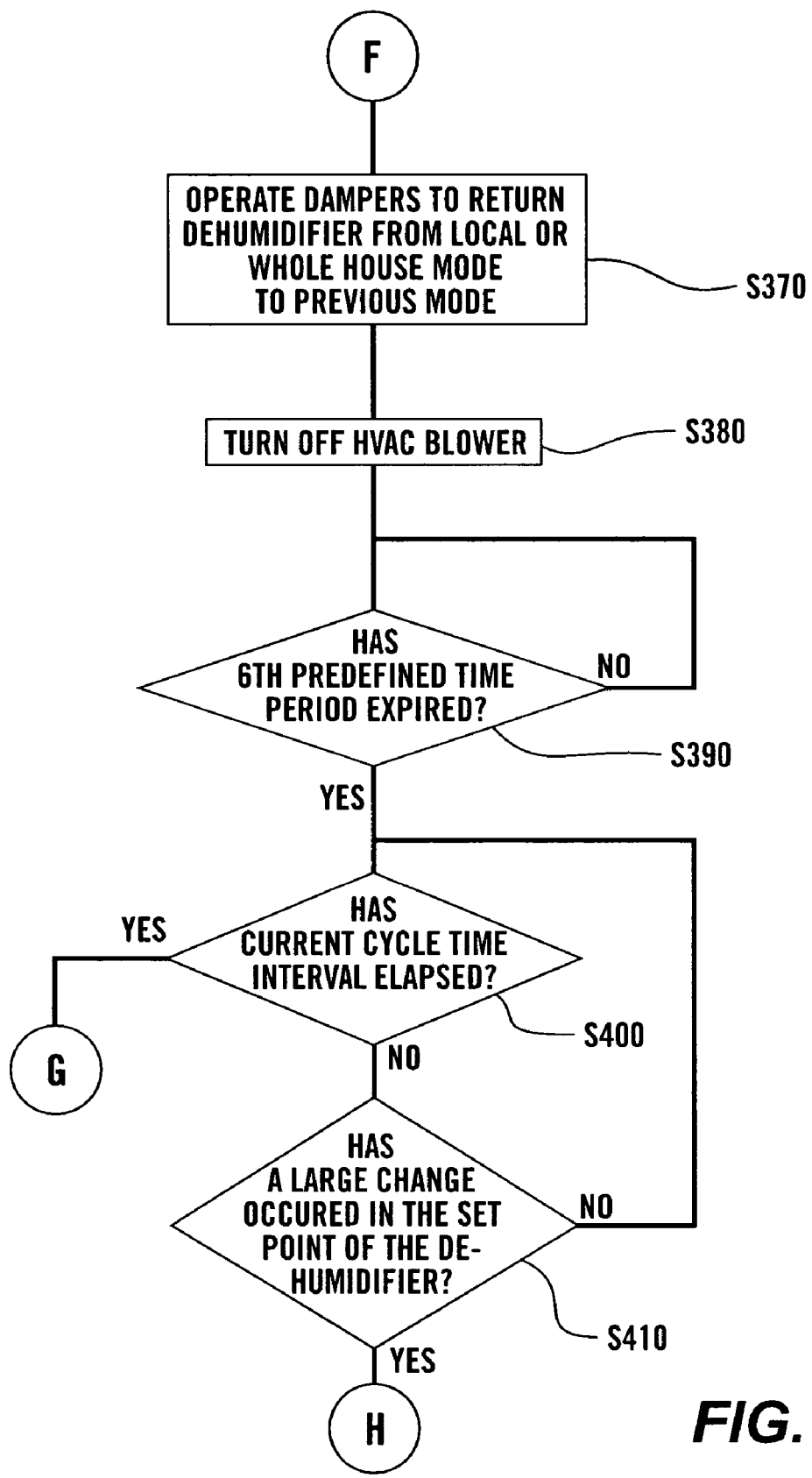

FIGS. 10 and 11 show a second exemplary embodiment of the whole-house convertible class of installations for the dehumidifier 100 according to this invention. As shown in FIGS. 10 and 11, in this second exemplary embodiment of the whole-house convertible mode, compared to the first exemplary embodiment shown in FIGS. 8 and 9, in place of the single interior space return duct 112, the dehumidifier 100 includes both the interior space return duct 112 and the return duct 113, which extends from the return duct 302 of the HVAC system 300 and is similar to the return duct 113 shown in FIG. 5. Each of the return ducts 112 and 113 terminates into the common return duct 111 that returns the air to be dehumidified to the dehumidifier 100.

Additionally, as shown in FIGS. 10 and 11, a second normally-open damper 143 is located in the return duct 112 between the interior space 400 and the common return duct portion 111. Similarly, a second normally-closed damper 147 is provided in the return duct 113 between the return duct 302 of the HVAC system 300 and the common return duct portion 111. As shown in FIG. 10, which is the default mode of operation of this exemplary embodiment of the whole-house convertible mode of installation, if the HVAC blower is not on when the dehumidifier 100 begins to sample the temperature and relative humidity of the air in the interior space 400, the normally closed dampers 145 and 147 are closed, shutting off the return duct 113 and the supply duct 115. At the same time, the normally-open dampers 141 and 143 are open, allowing air to be drawn from the interior space 400 to the return duct 112 and the common portion 111 and supplied to the interior space 400 through the common supply duct portion 117 and the interior space supply duct 116. Thus, in this default mode of operation, the dehumidifier 100 operates similarly to the local mode shown in FIGS. 7 and 8.

In contrast, as shown in FIG. 11, if the HVAC blower is on when the dehumidifier 100 starts to sample the temperature and relative humidity of the air in the interior space, the normally-open dampers 141 and 143 are energized to close off the interior space return duct 112 and the interior space supply duct 116. At the same time, the normally-closed dampers 145 and 147 are also energized to allow air to pass through the return duct 113 and the supply duct 115. As a consequence, as shown in FIG. 11, the dehumidifier 100 draws air from the return duct 302 of the HVAC system 300, through the return duct 113 and the common return duct portion 11, dehumidifies the withdrawn air, and supplies the dehumidified air through the common supply duct portion 117 and the supply duct 115 to the supply duct 304 of the HVAC system 300 downstream of the air conditioning coil 340.

That is, in the local mode, the four dampers 141-147 are configured to pull air from the chosen interior space area 400, dehumidify that air and supply the dehumidified air back to the same interior space area 400. This keeps the rest of the building or other serviced interior space and the localized interior space 400 somewhat separate. In contrast, when the four dampers 141-147 are energized or otherwise operated, air is pulled from the HVAC system return duct 302, is dehumidified, is supplied to the HVAC system supply duct 304 downstream of the air conditioning coil 340, so that the dehumidified air could be more or less evenly distributed throughout the entire building or interior space.

It should be appreciated that the convertible modes shown in FIGS. 8-11 need not use all of the controllable dampers 141-147. For example, one of the return duct dampers 143 or 147 could be omitted. In this case, when the dehumidifier 100 is in the local mode (if the damper 147 is omitted) or the whole-house mode (if the damper 143 is omitted), air to be dehumidified will be drawn both from the interior space 400 and from the HVAC return duct 302. In contrast, in the whole-house mode (if the damper 147 is omitted) or in the local mode (if the damper 143 is omitted), the dehumidifier 100 will draw air only from the HVAC return duct 302 or the interior space 400, respectively.

Likewise, one of the supply duct dampers 141 or 145 can be omitted. In this case, when the dehumidifier is in the local mode (if the damper 145 is omitted) or the whole-house mode (if the damper 141 is omitted), the dehumidified air will be supplied to both the interior space 400 and the HVAC supply duct 304. In contrast, in the whole-house mode (if the damper 145 is omitted) or in the local mode (if the damper 141 is omitted), the dehumidifier 100 will supply dehumidified air only to the HVAC supply duct 304 or the interior space 400, respectively.

It should be appreciated that, if backflow through the supply duct 115 is to be prevented by using the normally-closed damper 145, rather than omitting this damper 145, the damper 145 can be opened whenever the dehumidifier blower 120 is turned on, regardless of the mode, to obtain the same effect as omitting the damper It should also be appreciated that, with respect to FIGS. 3 and 7-11, multiple return ducts 112 can be used to draw air from multiple interior spaces 400 in the house or other building. Similarly, with respect to FIGS. 7-11, it should be appreciated that multiple supply ducts 116 could be used to supply dehumidified air to multiple interior spaces 400 in the house or other building. In such exemplary embodiments, additional controllable dampers could be placed on the return ducts 112 and/or the supply ducts 116 to allow the control system 200 to control which interior space or spaces 400 the air to be dehumidified is drawn from and/or to control which interior space or spaces 400 the dehumidified air is supplied to.

It should also be appreciated that the exemplary embodiments described above with respect to FIGS. 3-11 have been described assuming that the set of sensors 222 in the dehumidifier 100 would be used to take at least one of the temperature and/or relative humidity measurements. If neither one of the set of sensors 222 is used, then turning on the dehumidifier blower 120 and opening the damper 145 or the damper 147 (if implemented) when taking a temperature relative humidity sample can be omitted. This can also be omitted if sampling the temperature and/or relative humidity in the dehumidifier 100 or the ducts 111 or 112 can be performed without regard to the status of the air that is present in the dehumidifier 100 or the ducts 111 or 112.

FIGS. 12-16 are a flowchart outlining one exemplary embodiment of a method for operating a dehumidifier according to this invention. In particular, the method outlined in the flowchart shown in FIGS. 12-16 is particularly useful for a dehumidifier stalled in a whole-house convertible mode, as shown in FIGS. 8-11. It should be appreciated that various ones of these steps set forth in FIGS. 12-16 may not be appropriate for dehumidifiers installed in a local mode or in a whole-house only As shown in FIGS. 12-16, operation of the method begins in step S100, and continues to step S110, where the HVAC system and the dehumidifier are turned on or otherwise provided with power. Then, in step S120, a determination is made whether an HVAC blower call has been received from the HVAC system controls, such as a thermostat, or a zone control panel, or the like, within the current air cycling time interval. If so, operation jumps to step S150. Otherwise, operation continues to step S130.

In step S130, a determination is made whether a "large" change has occurred in the set point of the dehumidifier. If so, this triggers the demonstration mode, as described above, where the dehumidifier activates to demonstrate that it is operative. If a large change has occurred in the set point, operation again jumps to step S150. Otherwise, operation continues to step S140.

In step S140, a determination is made whether there is more than a first predefined time left in the current air cycling time interval. If so, operation returns to step S120. Otherwise, operation continues to step S150. In various exemplary embodiments, this first predefined time period is about three minutes. However, any time period that is appropriate for a particular installation of the dehumidifier can be used as the first predefined time period. It should be appreciated that steps S120-S140 form a loop that continues until either an HVAC blower call has been received, a "large" change has been made to the set point, or at most the first predetermined time is left in the current air cycling time interval. Once one of these three events occurs, operation continues to step S150.

In step S150, a determination is made whether the HVAC system is in the "blower mode". If so, operation continues to step S160. Otherwise, operation jumps directly to step S170. In step S160, a "pseudo" HVAC blower call is generated and forwarded to the HVAC equipment control system, so that the HVAC blower is turned on. A "pseudo" HVAC blower call is typically a signal from the dehumidifier to the HVAC system controls to turn on the HVAC blower that is not in response to the dehumidifier receiving an HVAC blower call from a thermostat, a zone control panel or other HVAC control device. Next, in step S170, the dehumidifier blower is turned on so that a stream of air passes through the dehumidifier. This is especially useful when the internal temperature and percent relative humidity sensor that extends into the air stream within the dehumidifier is implemented. Operation then continues to step S180.

In step S180, a determination is made whether an air conditioning call has been made or completed within a second predetermined time period. As outlined above, if an air conditioning call is currently being responded to by the HVAC system or was completed by the HVAC system within this second predefined time period prior to the dehumidifier blower being turned on, the dehumidifier does not want to take a temperature and relative humidity sample, as the sample may be distorted by the effect the air conditioning unit of the HVAC system may have on the air being sampled. Accordingly, if an air conditioning call is currently being responded to, or was completed less than the second predefined time period prior to the execution of step S180, control jumps back to step S180 and continues to loop through step S180 until the second predefined time period after the end of the air conditioning call has elapsed. At that time, control continues to step S190. It should be appreciated that in various exemplary embodiments, the second predefined period is six minutes. However, any time period that is appropriate for a particular installation of the dehumidifier can be used as the second predefined time period.

In step S190, a determination is made whether the HVAC blower is on. As outlined above, the HVAC blower will be on if the HVAC system is in blower mode and/or an HVAC blower call was detected in step S120 such that control jumped from step S120 to step S150. In step S190, if the HVAC blower is on, operation jumps to step S210. Otherwise, if the HVAC blower is off, operation continues to step S200. In step S200, the implemented spot dampers are operated to place the dehumidifier into a local mode configuration. Operation then jumps to step S220. In contrast, in step S210, the spot dampers are operated to place the dehumidifier into a whole-house mode. Operation then continues to step S220.

As outlined above, in the whole-house convertible mode for which this exemplary embodiment of the method is particular useful, the dehumidifier is convertible between a whole-house mode, where it is connected to the supply and return ducts of the HVAC system, and a local mode, where it is connected directly to the room to be dehumidified. Accordingly, in various exemplary embodiments, the state of the HVAC blower will determine which mode is appropriate. That is, if the HVAC blower is on, the whole-house mode can be used. In contrast, if the HVAC blower is not on, the local mode should be used. Otherwise, the dehumidifier blower would need to provide all of the motive power for driving the dehumidified air through the HVAC ducts, which it is not designed to do. Furthermore, it should be appreciated that, in non-convertible modes, where either the mode is either a fixed local mode or a fixed whole-house mode, it is not necessary to determine whether the blower is on and to operate the dampers accordingly. Accordingly, in such whole-house only or localized mode installations, steps S190-210 can be omitted.

It should be appreciated that, in various exemplary embodiments, in the whole-house only mode, since it is desirable that the HVAC blower always be on during operation of the dehumidifier, step S150 can also be omitted. In this case, operation jumps directly from steps S120, S130 or S140 to step S160 so that the HVAC blower always is turned on prior to turning on the dehumidifier blower in step S170. Likewise, it should be appreciated that, in some exemplary embodiments of local mode only installations, it may be irrelevant whether the HVAC blower is on or not. In such exemplary embodiments, both steps S150 and S160 can be omitted. Thus, in this case, in steps S120, S130 and S140, rather than jumping or continuing to step S150, operation jumps or continues directly to step S170.

In step S220, the temperature and percent relative humidity of the air to be dehumidified is sampled using a temperature sensor and a relative humidity sensor, or a combined sensor, which can each be positioned locally to or remotely from the dehumidifier for a predefined sample period. In various exemplary embodiments, the air to be dehumidified is sampled using a set of temperature and relative humidity that is positioned in or near the dehumidifier inlet or return duct and upstream of the dehumidifier coils. It should be appreciated that, in various exemplary embodiments, the sample period is approximately two minutes to approximately three minutes long. However, it should be appreciated that any appropriate sample period can be used in step S220. Then, in step S225, the dew point temperature of the sampled air is determined based on the measured temperature and percent relative humidity. Next, in step S230, a determination is made whether the determined dew point is above the set point of the dehumidifier. If not, operation jumps to step S360. Otherwise, operation continues to step S240.

It should be appreciated that the above-outlined description of steps S150-S230 is particularly well suited for exemplary embodiments of the dehumidifier system that use at least one of the temperature sensor and the relative humidity sensor that are located within the dehumidifier or the dehumidifier return duct. However, if neither of these sensors is used, i.e. both the temperature sensor and the relative humidity sensor that are being used are not located in the dehumidifier or the dehumidifier return duct, changes can be made to steps S150-S230.

In particular, since both active sensors are not operationally near the HVAC air conditioning coil, step S180 can be omitted. Additionally, since the operation of the sensors is not dependent on the operation of the HVAC or dehumidifier blowers or the status of the dampers (if implemented), steps S220-S230 can occur before step S170, or before step S150.

When both the temperature sensor and the relative humidity sensor are located away from the dehumidifier, both sensors can be located at the same location, as individual sensors or as part of a sensor combination or a single sensor. Alternatively, if at least one of the temperature sensor and the relative humidity sensor are not located in the dehumidifier or return duct, these two sensors can be located at different locations that do not necessarily experience the same temperature and/or relative humidity conditions. It should be appreciated that remote sensors that can be used to supply the dehumidifier with temperature and/or relative humidity measurements include sensors located in a dehumidifier remote control unit, sensors located within a thermostat and/or a zone control panel of the HVAC system, outside temperature and/or relative humidity sensors, and/or any other temperature and/or relative humidity sensors that may be connected to either the HVAC system and/or the dehumidifier.

In step S240, a determination is made whether the dehumidifier compressor is on. If the dehumidifier compressor is on, operation jumps directly to step S260. Otherwise, operation continues to step S250, where the dehumidifier compressor is turned on. Then, in step S260, a determination is made whether the dehumidifier has run for at least a third predefined time period. If not, operation jumps back to step S260 and continues to loop through step S260 until the dehumidifier has run for at least the third predetermined time period. Once the dehumidifier compressor has run for at least the third predetermined time period, operation continues to step S270. It should be appreciated that, in various exemplary embodiments, the third predetermined time period is about three minutes. However, it should be appreciated that any time period that is appropriate for a particular installation of the dehumidifier can be used as the third predefined time period.

In step S270, the temperature measured by the frost temperature sensor is read by the dehumidifier. Next, in step S280, a determination is made whether the temperature measured by the frost temperature sensor is less than a first predefined temperature. In various exemplary embodiments, the first predetermined temperature is about 45° F. However, it should be appreciated that any appropriate temperature at the location of the frost sensor can be used as the first predefined temperature. If the temperature measured by the frost temperature sensor is not less than the first predefined temperature, operation jumps to step S340. Otherwise, if the temperature measured by the frost temperature sensor is less than the first predefined temperature, operation continues to step S290.

In step S290, the time that the temperature measured by the frost temperature sensor is below the predetermined temperature is measured by starting or continuing the operation of some timing mechanism. Next, in step S300, a determination is made whether the temperature read by the frost sensor has been less than the first predefined temperature for at least a fourth predefined time. If not, operation again jumps to step S340. Otherwise, operation continues to step S310. It should be appreciated, that in various exemplary embodiments, this fourth predefined time is approximately 90 minutes. However, it should be appreciated that any appropriate length of time can be used as the fourth predefined time.

In step S310, because the temperature read by the frost sensor has been less than the predefined temperature for at least the fourth predefined time, the dehumidifier compressor is turned off for a fifth predefined time period and the measured time is reset to zero. Once the fifth predefined time period has elapsed, operation continues from step S310 to step S320. It should be appreciated that, in various exemplary embodiments, the fifth predefined time period is approximately ten minutes. However, it should be appreciated that any appropriate time period can be used as the fifth predefined time period.

Additionally, it should be appreciated, that in various exemplary embodiments, during step S310, the temperature and relative humidity sensor can continue to operate and the determined dew point temperature based on the measured temperature and percent relative humidity can continue to be determined and compared to the set point temperature. In this case, if the determined dew point temperature is found to be at below the set dew point temperature, operation immediately jumps to step S350.

In step S320, the temperature measured by the frost temperature sensor is again read or input. Then, in step S330, a determination is made whether the temperature read by the frost temperature sensor is greater than or equal to a second predefined temperature. If so, operation continues to step S340. Otherwise, operation returns to step S320. Thus, operation loops around steps S320 and S330 until the temperature read by the frost temperature sensor is at least equal to the second predefined temperature. It should be appreciated that, in various exemplary embodiments, the second predefined temperature is approximately 50° F. However, it should be appreciated that any appropriate value for the second predefined temperature can be used.

In step S335, the temperature and percent relative humidity readings of the temperature and relative humidity sensor are again made. Then, in step S340, a determination of the current dew point temperature based on these new readings from the temperature and relative humidity sensor is made. Next, in step S345, a determination is made whether the current determined dew point temperature is above the set dew point temperature for the dehumidifier. If so, operation jumps back to step S240, so that the dehumidifier can continue to operate to further reduce the relative humidity of the air stream passing through the dehumidifier. Otherwise, in step S345, if the current determined dew point is at or below the set dew point temperature of the dehumidifier, operation continues to step S350.

It should be appreciated that, in various exemplary embodiments of the dehumidifier according to this invention, an offset temperature is applied to the set dew point temperature when determining whether to turn off the dehumidifier. That is, in such exemplary embodiments, the determined dew point temperature must not only be below the set dew point temperature, but must be below the set dew point temperature by at least the offset temperature. In various exemplary embodiments, this offset temperature is 1.5° F. This offset temperature tends to avoid short cycling operation of the dehumidifier.

In step S350, the dehumidifier compressor is turned off. Then, in step S360, the dehumidifier blower is turned off. Next, in step S370, the dampers are operated to return the HVAC system from the local or whole-house mode, based on how the dampers were operated in step S200 or S210, to the previous state of the HVAC system as it existed prior to either step S200 or S210. Operation then continues to step S380.

In step S380, the HVAC blower is turned off. Next, in step S390, a determination is made whether a sixth predefined time period has expired. If not, operation returns to step S390, such that operation continues to loop through step S390 until the sixth predetermined time period has expired. Upon the sixth period defined time period expiring, operation continues to step S400. It should be appreciated that, in various exemplary embodiments, this sixth predetermined time period is approximately two minutes. However, it should be appreciated that, in some exemplary embodiments, this sixth predefined time period can be longer than two minutes. It should be appreciated that any appropriate time period can be used as the sixth predefined time period. It should also be appreciated that the sixth predefined time period sets a minimum period for which the dehumidifier is idle. This prevents short cycling and other inefficient operations of the dehumidifier.

In step S400, a determination is made whether the current air cycling time interval has elapsed. If not, operation continues to step S410. Otherwise, if the current air cycling time interval has elapsed, operation returns to step S1120. In step S410, a determination is made whether a large change has occurred in the set dew point temperature of the dehumidifier. If so, operation jumps directly back to step S150. Otherwise, operation returns to step S400. It should be appreciated that step S400 ensures that only one operation of the dehumidifier occurs during each air cycling time interval and thus generally corresponds to step S140. Similarly, step S410 generally corresponds to step S130. Step S410 insures that, if the user creates a "large" change in the set dew point temperature of the dehumidifier, operation immediately jumps to step S150 without waiting for the current air cycling time interval to elapse, as required in step S400.

It should be appreciated that, if an outside air ventilation system, such as that described in the incorporated '806 patent, is implemented, the main control system 200 can, and typically will, be used to control the outside air damper, such as the damper 160, in conjunction with controlling the dehumidifier 100 and, at least in part, the HVAC system 300. In various exemplary embodiments, the main control system 200 will operate the outside air damper and possibly the HVAC blower without tying that operation to the operation of the dehumidifier 100. However, the operation of the outside air damper 160 can be linked to the operation of the dehumidifier 100, if desired.

It should also be appreciated that the operation of the dehumidifier 100 does not disrupt or interrupt the normal operation of the HVAC system 300. Thus, when the thermostat or zone control panel 310 outputs the $G_{STAT}$ signal, either by itself or with the heating signal W or the cooling signal Y, those signals will be received by the HVAC equipment low voltage control 320, either directly or by being faithfully passed on by the main control system 200.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A method for automatically dehumidifying at least one interior space of a structure using a dehumidifier at least indirectly connected to the at least one interior space by at least one dehumidifier return duct and at least one dehumidifier supply duct, the structure having an HVAC system that has at least an HVAC blower and that is connected to at least the at least one interior space through at least one of at least an HVAC supply duct and at least an HVAC return duct, the HVAC blower turned on by the HVAC system in response to blower call signals, the dehumidifier associated with the HVAC system and comprising a housing connected to the dehumidifier return and supply ducts and a compressor, a dehumidifier blower, a temperature sensor and a relative humidity sensor contained within the housing, the method comprising:
    determining if a measurement event has occurred; and
    if a measurement event has occurred:
        determining if the HVAC system is in a blower mode;
        if the HVAC system is in the blower mode:
            determining if the HVAC blower is on; and
            if the HVAC blower is not on;
                turning the HVAC blower on;
        measuring a temperature and a relative humidity of an ambient atmosphere within the housing using the temperature sensor and the relative humidity sensor,
        determining a dew point temperature for the interior space based on the measured temperature and relative humidity;
        determining if the determined dew point temperature is above a predetermined dew point temperature; and
        if the determined dew point temperature is above the predetermined dew point temperature
            turning on a compressor of the dehumidifier,
            if a blower of the dehumidifier is not on, turning on the blower of the dehumidifier,
            drawing air to be dehumidified from at least the at least one interior space through at least the at least one dehumidifier return duct;
            dehumidifying the drawn air; and
            returning the dehumidified air to at least the at least one interior space through at least the at least one dehumidifier supply duct.

2. The method of claim 1, wherein determining if a measurement event has occurred comprises determining if the predetermined dew point temperature has been changed by at least a predetermined amount.

3. The method of claim 2, wherein:
    the dehumidifier has a device usable to select the predetermined dew point temperature; and
    changing the predetermined dew point temperature by at least the predetermined amount comprises operating the device by at least an amount that corresponds to the predetermined amount.

4. The method of claim 1, wherein:
    determining if a measurement event has occurred comprises determining if a blower call signal has been output.

5. The method of claim 4, wherein:
    the dehumidifier has a current air cycle interval; and
    determining if a blower call signal has been output comprises determining if the output blower call signal is a first blower call signal of the current air cycle interval.

6. The method of claim 5, wherein determining if a measurement event has occurred further comprises determining that a measurement event has occurred only if the output blower call signal is the first blower call signal of the current air cycle interval.

7. The method of claim 1, wherein:
    the dehumidifier has a current air cycle interval; and
    determining if a measurement event has occurred comprises determining if the current air cycle interval is within a first predefined interval before the end of the current air cycle interval.

8. The method of claim 7, wherein:
    the dehumidifier is associated with an HVAC system that has at least an HVAC blower and that is connected to at least the at least one interior space through at least one of at least an HVAC supply duct and at least an HVAC return duct, the HVAC blower turned on by the HVAC system in response to blower call signals; and
    determining if a measurement event has occurred further comprises determining that a measurement event has occurred only if the current air cycle interval is within the first predefined interval before the end of the current air cycle interval and no blower call signals have been received during the current air cycle interval.

9. The method of claim 1, wherein:
    the temperature and relative humidity sensors are located within the housing such that the temperature and relative humidity sensors are within an air stream of air to be dehumidified supplied to the housing from the at least one return duct; and
    measuring the temperature and relative humidity of the ambient atmosphere within the housing comprises measuring the temperature and relative humidity of the air to be dehumidified supplied to the housing from the at least one return duct.

10. The method of claim 1, wherein:
    the dehumidifier is located outside of the at least one interior space to be dehumidified such that the temperature and relative humidity sensors are outside of the at least one interior space; and
    measuring the temperature and relative humidity of the ambient atmosphere within the housing comprises measuring the temperature and relative humidity of air outside of the at least one interior space to be dehumidified.

11. The method of claim 1, further comprising, prior to measuring the temperature and relative humidity:
    turning on the dehumidifier blower; and
    waiting at least a first predefined period before measuring the temperature and relative humidity.

12. The method of claim 11, further comprising, prior to measuring the temperature and relative humidity, ensuring the HVAC blower is on.

13. The method of claim 1, wherein:
the at least one dehumidifier return duct and the at least one dehumidifier supply duct comprise:
at least one of:
a common dehumidifier supply duct portion connected to the dehumidifier, at least one dehumidifier supply duct connected directly to the at least one interior space and to the common dehumidifier supply duct portion and at least one dehumidifier supply duct connected to the HVAC supply duct and to the common dehumidifier supply duct portion, and
a common dehumidifier return duct portion connected to the dehumidifier, at least one dehumidifier return duct connected directly to the at least one interior space and to the common dehumidifier return duct portion and at least one dehumidifier return duct connected to the HVAC return duct and to the common dehumidifier return duct portion; and
at least one controllable damper located within at least one of the at least one dehumidifier return duct and the at least one dehumidifier supply duct; and
the method further comprises:
if the HVAC blower is turned on, operating the at least one controllable damper to connect the dehumidifier to at least the HVAC supply duct through at least the at least one dehumidifier supply duct; and
if the HVAC blower is not turned on, operating the at least one controllable damper to connect the dehumidifier to at least the at least one interior space through at least the at least one dehumidifier supply duct.

14. The method of claim 13, further comprising:
if the HVAC blower is turned on, operating the at least one controllable damper to connect the dehumidifier to the HVAC supply duct through at least the at least one dehumidifier supply duct and to the HVAC return duct through at least the at least one dehumidifier return duct and to disconnect the dehumidifier from the at least one interior space,
if the HVAC blower is not turned on, operating the at least one controllable damper to connect the dehumidifier to the at least one interior space through at least the at least one dehumidifier supply duct and to the at least one interior space through at least the at least one dehumidifier return duct and to disconnect the dehumidifier from the HVAC supply duct and from the HVAC return duct.

15. The method of claim 1, further comprising:
determining if the compressor has run for at least a first predefined period; and
if the compressor has not run for at least the first predefined period, continuing to run the compressor.

16. The method of claim 15, further comprising, if the compressor has run for at least the first predefined period:
measuring a second temperature at least near a set of cooling coils connected to the compressor;
determining if the measured second temperature is less than a first predefined temperature; and
if the measured second temperature is not less than the first predefined temperature:
measuring the temperature of the ambient atmosphere around the temperature sensor,
measuring the relative humidity of the ambient atmosphere around the relative humidity sensor,
determining the dew point temperature for the interior space based on the measured temperature and relative humidity,
determining if the determined dew point temperature is above the predetermined dew point temperature, and
if the determined dew point temperature is above the predetermined dew point temperature, continuing to run the compressor.

17. The method of claim 16, further comprising, if the determined dew point temperature is at least equal to the predetermined dew point temperature, turning off the dehumidifier blower and compressor.

18. The method of claim 17, further comprising, if the determined dew point temperature is at least equal to the predetermined dew point temperature, turning off the HVAG blower.

19. The method of claim 18, wherein:
the at least one dehumidifier return duct and the at least one dehumidifier supply duct comprise:
at least one of:
a common dehumidifier supply duct portion connected to the dehumidifier, at least one dehumidifier supply duct connected directly to the at least one interior space and to the common dehumidifier supply duct portion and at least one dehumidifier supply duct connected to the HVAC supply duct and to the common dehumidifier supply duct portion, and
a common dehumidifier return duct portion connected to the dehumidifier, at least one dehumidifier return duct connected directly to the at least one interior space and to the common dehumidifier return duct portion and at least one dehumidifier return duct connected to the HVAC return duct and to the common dehumidifier return duct portion; and
at least one controllable damper located within at least one of the at least one dehumidifier return duct and the at least one dehumidifier supply duct; and
the method further comprising, if the determined dew point temperature is at least equal to the predetermined dew point temperature, operating the at least one controllable damper to return the at least one controllable damper to a state each at least one controllable damper was in prior to the measurement event occurring.

20. The method of claim 17, further comprising:
determining if a second predetermined period has elapsed since the dehumidifier compressor was turned off; and
if the second predetermined period has not elapsed, waiting for the second predetermined time to elapse.

21. The method of claim 20, further comprising, if the second predetermined time period has elapsed:
determining if a current air cycle time interval of the dehumidifier, which the dehumidifier was in when the measurement event occurred, has elapsed; and
if that current air cycle time interval has elapsed, determining if a new measurement event has occurred.

22. The method of claim 21, further comprising, if that current air cycle time has not elapsed:
determining if the predetermined dew point temperature has been changed by at least a predetermined amount; and
if the predetermined dew point temperature has been changed by at least the predetermined amount, determining that a new measurement event has occurred.

23. The method of claim 22, further comprising, if the predetermined dew point temperature has not been changed by at least the predetermined amount, repeating the second predetermined period elapse determination step.

24. The method of claim 16, further comprising, if the measured second temperature is less than the first predefined temperature:
  measuring a second time period since the measured second temperature was determined to be less than the first predefined temperature;
  determining if the second time period is at least equal to a second predetermined time period; and
  if the second time period is at least equal to the second predetermined time period:
    turning off the compressor, and
    waiting for a third predefined time period to elapse.

25. The method of claim 24, further comprising, after the third predefined time period has elapsed:
  measuring the second temperature at least near the set of cooling coils connected to the compressor;
  determining if the measured second temperature at least a second predefined temperature; and
  if the measured second temperature is not at least the second predefined temperature, repeating these steps until the second temperature is at least the second predefined temperature.

26. The method of claim 1, wherein the structure is a residential, office or light commercial structure.

27. A method for automatically dehumidifying at least one interior space of a structure using a dehumidifier at least indirectly connected to the at least one interior space by at least one dehumidifier return duct and at least one dehumidifier supply duct, the dehumidifier comprising a housing connected to the dehumidifier return and supply ducts and a compressor, a dehumidifier blower, a temperature sensor and a relative humidity sensor associated with the housing, the method comprising:
  determining is a measurement event has occurred; and
  if a measurement event has occurred:
    determining, prior to measuring a temperature and a relative humidity, if an air conditioning call has been made or completed within a first predetermined time;
    if an air conditioning call has been made or completed within a first predetermined time, waiting until no conditioning call has been made or completed within the first predetermined time before measuring the temperature and relative humidity;
    measuring, subsequent to at least the determining step, the temperature and the relative humidity of an ambient atmosphere within the housing using the temperature sensor and the relative humidity sensor;
    determining a dew point temperature for the interior space based on the measured temperature and relative humidity;
    determining if the determined dew point temperature is above a predetermined dew point temperature; and
    if the determined dew point temperature is above the predetermined dew point temperature:
      turning on the compressor of the dehumidifier,
      if the blower if the dehumidifier is not on, turning on the blower of the dehumidifier,
      drawing air to be dehumidified from at least the at least one interior space through at least the at least one dehumidifier return duct;
      dehumidifying the drawn air; and
      returning the dehumidified air to at least the at least one interior space through at least the at least one dehumidifier supply duct.

28. A method for automatically dehumidifying at least one interior space of a structure, the structure having an HVAC system that includes an HVAC return duct, an HVAC supply duct, an HVAC blower and at least one HVAC control device that outputs blower call signals, the HVAC blower turned on by the HVAC system in response to the blower call signals, using a dehumidifier connected to the at least one interior space by at least the HVAC system, the dehumidifier comprising a housing and a compressor, a blower, a temperature sensor and a relative humidity sensor located within the housing, the method comprising:
  determining if a measurement event has occurred; and
  if a measurement event has occurred:
    turning on the blower of the dehumidifier;
    turning on the HVAC blower if it is not already on;
    waiting for a first predefined period;
    measuring a temperature of an ambient atmosphere within the housing using the temperature sensor after the first predefined period has elapsed;
    measuring a relative humidity of an ambient atmosphere within the housing using the relative humidity sensor after the first predefined period has elapsed;
    determining a dew point temperature for the interior space based on the measured temperature and relative humidity;
    determining if the determined dew point temperature is above a predetermined dew point temperature; and
    if the determined dew point temperature is above the predetermined dew point temperature
      turning on the compressor of the dehumidifier,
      drawing air to be dehumidified from at least the HVAC return duct through at least at least one dehumidifier return duct;
      dehumidifying the drawn air; and
      returning the dehumidified air to at least the HVAC supply duct through at least at least one dehumidifier supply duct.

29. The method of claim 28, wherein waiting for the first predefined period comprises waiting for two minutes.

30. The method of claim 28, wherein:
  determining if a measurement event has occurred comprises determining if a blower call signal has been output.

31. The method of claim 30, wherein:
  the dehumidifier has a current air cycle interval; and
  determining if a blower call signal has been output comprises determining if the output blower call signal is a first blower call signal of the current air cycle interval.

32. The method of claim 31, wherein determining if a measurement event has occurred further comprises determining that a measurement event has occurred only if the output blower call signal is the first blower call signal of the current air cycle interval.

33. The method of claim 28, wherein:
  the dehumidifier has a current air cycle interval; and
  determining if a measurement event has occurred comprises determining that a measurement event has occurred only if the current air cycle interval is within the first predefined interval before the end of the current air cycle interval and no blower call signals have been received during the current air cycle interval.

34. The method of claim 33, wherein determining that a measurement event has occurred only if the current air cycle interval is within the first predefined interval before the end of the current air cycle interval comprises determining that a measurement event has occurred only if the current air cycle interval is within three minutes before the end of the current air cycle interval.

35. The method of claim 28, wherein:
the dehumidifier is located outside of the at least one interior space to be dehumidified such that the temperature and relative humidity sensors are outside of the at least one interior space; and
measuring the temperature and the relative humidity of an ambient atmosphere within the housing using the temperature and relative humidity sensors comprises measuring the temperature and relative humidity of air outside of the at least one interior space to be dehumidified.

36. A dehumidifier system usable to automatically dehumidify at least one interior space of a structure, the structure having an HVAC system that includes at least an HVAC blower and that is connected to the interior space through at least one of at least an HVAC supply duct and at least an HVAC return duct, the HVAC blower turned on by the HVAC system in response to blower call signals, the dehumidifier system associated with the HVAC system and comprising:
a compressor;
a dehumidifier blower;
a temperature sensor;
a relative humidity sensor;
a housing, the compressor, the blower, the temperature sensor and the relative humidity sensor contained within the housing;
a control system;
at least one dehumidifier return duct; and
at least one dehumidifier supply duct, wherein:
the housing is at least indirectly connected to the at least one interior space by the at least one dehumidifier return duct and the at least one dehumidifier supply duct,
the control system determines whether a measurement event has occurred;
the control system, in response to an occurrence of a measurement event, determines if the HVAC system is in a blower mode;
the control system, in response to the HVAC system being in a blower mode, determines if the HVAC blower is on and, if the blower is not on, turns on the blower;
the control system, in response to an occurrence of a measurement event, determines a dew point temperature based on a temperature and a relative humidity of an ambient atmosphere within the housing as measured by the temperature and relative humidity sensors, and determines, if the determined dew point temperature is above a predetermined dew point temperature, and
the control system, in response to the determined dew point temperature being above the predetermined dew point temperature, turns on the compressor of the dehumidifier and if the dehumidifier blower is not on, turns on the dehumidifier blower, such that air to be dehumidified is drawn from at least the at least one interior space through at least the at least one dehumidifier return duct, dehumidified and returned to at least the at least one interior space through at least the at least one dehumidifier supply duct.

37. The dehumidifier system of claim 36, further comprising a set of coils comprising at least one coil, wherein:
the at least dehumidifier return duct supplies a stream of air to be dehumidified to the housing that is at least indirectly drawn from the interior space;
at least one of the temperature and humidity sensors are located within the housing such that the at least one of the temperature and humidity sensors is upstream of the at least one coil and the at least one of the temperature and humidity sensors senses the at least respective one of the temperature and humidity of the air supplied to the housing to be dehumidified.

38. The dehumidifier system of claim 37, wherein the at least one of the temperature and humidity sensors that is located within the housing projects into the stream of air supplied from the at least one dehumidifier return duct.

39. The dehumidifier system of claim 38, wherein the at least one of the temperature and humidity sensors that is located within the housing projects into a central portion of the stream of air supplied from the at least one dehumidifier return duct.

40. The dehumidifier system of claim 36, wherein, in response to the occurrence of a measurement event, the control system operates the blower of the dehumidifier for at least a first time period before inputting the at least one of the temperature and humidity measurements from the at least one of the temperature and humidity sensors that is located within the housing.

41. The dehumidifier system of claim 36, further comprising a dew point setting device connected to the control system, the dew point setting device inputting the set dew point temperature to the control system.

42. The dehumidifier system of claim 41, wherein, when the dew point setting device is operated to change the set dew point temperature by a least a first amount, the control system determines that a measurement event has occurred.

43. The dehumidifier system claim 36, wherein the temperature and relative humidity sensors are located outside of the at least one interior space.

44. The dehumidifier system of claim 36, wherein the control system determines if the HVAC system is currently responding to a cooling call or has finished responding to a cooling call within a first time period of receiving the measurement event, and, if the HVAC is currently responding to a cooling call or has finished responding to a cooling call within a first time period of receiving the measurement event, the control system waits until the first time period has elapsed since the HVAC system has finished responding to the cooling call before proceeding to respond to the measurement event.

45. The dehumidifier system of claim 36, wherein:
the HVAC system includes at least one HVAC system control device that outputs blower call signals;
the control system receives blower call signals output by at least one of the at least one HVAC system control device; and
the control system determines that a measurement event has occurred when the control system receives a first blower call signal within an air cycle interval.

46. The dehumidifier system of claim 45, further comprising an air cycle interval setting device connected to the control system, the air cycle interval setting device inputting the air cycle interval to the control system.

47. The dehumidifier system of claim 36, wherein:
the HVAC system includes at least one HVAC system control device that outputs blower call signals;
the control system receives blower call signals output by at least one of the at least one HVAC system control device; and
the control system determines that a measurement event has occurred when the control system has not received a first blower call signal before an occurrence of a first point in time before an end of an air cycle interval.

48. The dehumidifier system of claim 47, further comprising an air cycle interval setting device connected to the control system, the air cycle interval setting device inputting the air cycle interval to the control system.

49. The dehumidifier system of claim 36, wherein:
the HVAC system includes at least one HVAC system control device that outputs blower call signals;
the control system receives blower call signals output by at least one of the at least one HVAC system control device and outputs blower call signals to the HVAC equipment control device; and
in response to the occurrence of a measurement event, the control system determines if the HVAC system is in a blower mode, and, if the HVAC system is in a blower mode, outputs a pseudo blower call to the HVAC equipment control device.

50. The dehumidifier system of claim 36, wherein:
the HVAC system includes at least one HVAC system control device that outputs blower call signals;
at least one of the at least one dehumidifier supply duct is connected to the HVAC supply duct and includes a controllable damper connected to the control system;
at least one of the at least one dehumidifier supply duct is connected to the interior space and includes a controllable damper connected to the control system;
the control system, in response to the occurrence of a measurement event, determines if the HVAC blower is on; and
the control system, if the HVAC blower is on, operates the dampers in the at least one dehumidifier supply ducts to open the at least one dehumidifier supply duct that is connected to the HVAC supply duct and to close the at least one dehumidifier supply duct that is connected to the interior space.

51. The dehumidifier system of claim 50, wherein the control system, if the HVAC blower is not on, operates the dampers in the at least one dehumidifier supply ducts to close the at least one dehumidifier supply duct that is connected to the HVAC supply duct and to open the at least one dehumidifier supply duct that is connected to the interior space.

52. The dehumidifier system of claim 50, wherein:
at least one of the at least one dehumidifier return duct is connected to the HVAC return duct and includes a controllable damper connected to the control system;
at least one of the at least one dehumidifier return duct is connected to the interior space and includes a controllable damper connected to the control system; and
the control system, if the HVAC blower is on, operates the dampers in the at least one dehumidifier return ducts to open the at least one dehumidifier return duct that is connected to the HVAC return duct and to close the at least one dehumidifier return duct that is connected to the interior space.

53. The dehumidifier system of claim 52, wherein the control system, if the HVAC blower is not on, operates the dampers in the at least one dehumidifier return ducts to close the at least one dehumidifier return duct that is connected to the HVAC return duct and to open the at least one dehumidifier supply duct that is connected to the interior space.

54. The dehumidifier system of claim 50, wherein:
at least one of the at least one dehumidifier return duct is connected to the HVAC return duct and includes a controllable damper connected to the control system;
at least one of the at least one dehumidifier return duct is connected to the interior space; and
the control system, if the HVAC blower is on, operates the damper in the at least one dehumidifier return duct to open the at least one dehumidifier return duct that is connected to the HVAC return duct.

55. The dehumidifier system of claim 54, wherein the control system, if the HVAC blower is not on, operates the damper in the at least one dehumidifier return duct to close the at least one dehumidifier return duct that is connected to the HVAC return duct.

56. The dehumidifier system of claim 50, wherein:
at least one of the at least one dehumidifier return duct is connected to the HVAC return duct;
at least one of the at least one dehumidifier return duct is connected to the interior space and includes a controllable damper connected to the control system; and
the control system, if the HVAC blower is on, operates the damper in the at least one dehumidifier return duct to close the at least one dehumidifier return duct that is connected to the interior space.

57. The dehumidifier system of claim 56, wherein the control system, if the HVAC blower is not on, operates the damper in the at least one dehumidifier return ducts to open the at least one dehumidifier supply duct that is connected to the interior space.

58. The dehumidifier system of claim 36, wherein the control system operates the compressor for at least a first time period.

59. The dehumidifier system of claim 58, further comprising:
a set of coils; and
a frost sensor associated with the set of coils, the frost sensor outputting a measured frost temperature to the control system, wherein:
after the control system operates the compressor for at least the first time period, the control system determines if the measured frost temperature is less than a first temperature, and
if the measured frost temperature is less than a first temperature, the control system determines an amount of time that the measured frost temperature has been less than a first temperature.

60. The dehumidifier system of claim 59, wherein, if the determined amount of time is greater than a first amount of time, the control system turns off the compressor, waits for a second time period, inputs the measured frost temperature and determines if the measured frost temperature is at least equal to a second temperature.

61. The dehumidifier system of claim 60, wherein the control system continues to input the measured frost temperature and determine if the measured frost temperature is at least equal to the second temperature until the measured frost temperature is at least equal to the second temperature.

62. The dehumidifier system of claim 59, wherein, if the measured amount of time is not greater than the first amount of time, the control system again determines the measured dew point temperature of the air to be dehumidified and, if the measured dew point temperature is above the set dew point temperature, the control system again operates the compressor for at least the first time period.

63. The dehumidifier system of claim 59, wherein, if the measured amount of time is not greater than the first amount of time, the control system determines the measured dew point temperature of the air to be dehumidified, and, if the measured dew point temperature is not above the set dew point temperature, the control system turns off the dehumidifier compressor and blower.

64. The dehumidifier system of claim 59, wherein, if the measured frost temperature is not less than the first temperature, the control system again determines the measured dew point temperature of the air to be dehumidified, and, if the measured dew point temperature is above the set dew point temperature, the control system again operates the compressor for at least the first time period.

65. The dehumidifier system of claim 59, wherein, if the measured frost temperature is not less than the first temperature, the control system again determines the measured dew point temperature of the air to be dehumidified, and, if the measured dew point temperature is not above the set dew point temperature, the control system turns off the dehumidifier compressor and blower.

66. The dehumidifier system of claim 36, wherein, if the dew point temperature of the air to be dehumidified is not above the set dew point temperature, the control system turns off the dehumidifier blower if it is running and the HVAC blower if it is running.

67. The dehumidifier system of claim 36, wherein:

the HVAC system includes, an HVAC equipment control device that controllably operates at least the HVAC blower in response to blower call signals, at least one HVAC system control device that outputs blower call signals and at least one ventilation duct connected to the HVAC return duct and that includes a controllable damper connected to the control system;

the control system, in response to the occurrence of a measurement event, determines if the HVAC blower is on; and the control system, if the HVAC blower is on, operates the damper in the at least one ventilation duct to open the at least one ventilation duct to supply outside air to the HVAC system.

* * * * *

UNITED STATES PATENT AND TRADEMARK OFFICE
CERTIFICATE OF CORRECTION

PATENT NO. : 7,574,871 B2
APPLICATION NO. : 10/974319
DATED : August 18, 2009
INVENTOR(S) : Bloemer et al.

It is certified that error appears in the above-identified patent and that said Letters Patent is hereby corrected as shown below:

In The Specification

In Column 1, Line 22, delete "715" and insert -- '715 -- therefor.

In Column 15, Line 46, delete "humidifier 100." and insert -- dehumidifier 100. -- therefor.

In Column 15, Line 48, delete "dehumidifier 110" and insert -- dehumidifier 100 -- therefor.

In Column 21, Line 8, delete "portion 11," and insert -- portion 111, -- therefor.

In Column 21, Line 52, delete "damper" and insert -- damper 145. -- therefor.

In Column 22, Line 15, delete "stalled" and insert -- installed -- therefor.

In Column 22, Line 19, delete "only" and insert -- only mode. -- therefor.

In Column 23, Line 49, delete "S190-210" and insert -- S190-S210 -- therefor.

In Column 26, Line 43, delete "S1120." and insert -- S120. -- therefor.

In The Claims

In Column 27, Line 53, in Claim 1, delete "temperature" and insert -- temperature: -- therefor.

In Column 30, Line 17, in Claim 18, delete "HVAG" and insert -- HVAC -- therefor.

In Column 31, Line 36, in Claim 27, delete "determining is" and insert -- determining if -- therefor.

Signed and Sealed this
Fourteenth Day of June, 2016

Michelle K. Lee
*Director of the United States Patent and Trademark Office*

CERTIFICATE OF CORRECTION (continued)

In Column 31, Line 59, in Claim 27, delete "if the blower if the dehumidifier" and insert -- if the blower of the dehumidifier -- therefor.

In Column 32, Line 30, in Claim 28, delete "temperature" and insert -- temperature: -- therefor.

In Column 32, Line 33, in Claim 28, delete "at least at least" and insert -- at least the at least -- therefor.

In Column 32, Line 37, in Claim 28, delete "at least at least" and insert -- at least the at least -- therefor.

In Column 33, Line 50, in Claim 36, delete "determines," and insert -- determines -- therefor.

In Column 33, Lines 51-52, in Claim 36, delete "temperature, and" and insert -- temperature; and -- therefor.

In Column 33, Line 61, in Claim 36, delete "at the least" and insert -- at least -- therefor.

In Column 34, Line 30, in Claim 42, delete "a least" and insert -- at least -- therefor.

In Column 34, Line 32, in Claim 43, delete "system claim" and insert -- system of claim -- therefor.